(12) United States Patent
Baldwin

(10) Patent No.: US 7,177,623 B2
(45) Date of Patent: Feb. 13, 2007

(54) LOCALIZED CELLULAR AWARENESS AND TRACKING OF EMERGENCIES

(75) Inventor: Johnny E. Baldwin, Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 321 days.

(21) Appl. No.: 10/883,125

(22) Filed: Jul. 1, 2004

(65) Prior Publication Data

US 2005/0003797 A1    Jan. 6, 2005

Related U.S. Application Data

(60) Provisional application No. 60/484,477, filed on Jul. 2, 2003.

(51) Int. Cl.
*H04M 11/04* (2006.01)
*H04Q 7/20* (2006.01)

(52) U.S. Cl. .............. 455/404.2; 455/435.1; 455/456.1; 455/456.2; 455/456.5; 379/45; 379/37; 379/215.01

(58) Field of Classification Search ............. 455/404.2, 455/435.1, 456.1, 456.2, 456.5; 379/45, 379/37, 201.01
See application file for complete search history.

(56) References Cited

U.S. PATENT DOCUMENTS

| | | |
|---|---|---|
| 6,111,540 A | 8/2000 | Krasner |
| 6,292,542 B1 * | 9/2001 | Bilder ......................... 379/45 |
| 6,529,722 B1 | 3/2003 | Heinrich et al. |
| 6,539,232 B2 | 3/2003 | Hendrey et al. |
| 6,542,748 B2 | 4/2003 | Hendrey et al. |
| 6,542,749 B2 | 4/2003 | Tanaka et al. |
| 6,542,750 B2 | 4/2003 | Hendrey et al. |
| 6,993,118 B2 * | 1/2006 | Antonucci et al. ............ 379/45 |
| 2004/0029558 A1 * | 2/2004 | Liu .......................... 455/404.2 |

OTHER PUBLICATIONS

Gibbons, Glen, "Out with the New," GPS World, Mar. 1, 2003, <http://gpsworld.com/gpsworld/content/printContentPopup.jsp?id=49379>.
"The Pocket PC Goes Tactical," Jun. 16, 2006, 4 pp., <http://www.officer.com/article/printer.jsp?id=30997&siteSection=20>.
Wolf, Gary, "Reinventing 911," Wired Magazine, Issue 13.12, Dec. 2005, 12 pp., <http://www.wired.com/wired/archive/13.12/warning.html>.

* cited by examiner

*Primary Examiner*—William Trost
*Assistant Examiner*—Julio Perez
(74) *Attorney, Agent, or Firm*—U.S. Army Space and Missile Defense Command

(57) ABSTRACT

A method of initiating a telecommunication connection between a wireless 911 caller, an emergency 911 dispatcher, and at least one emergency personnel, including identifying a geographical location of a wireless 911 caller; identifying at least one emergency personnel located proximal to the geographical location of the wireless 911 caller; and initiating a telecommunication connection between each of the wireless 911 caller, an emergency 911 dispatcher, and the at least one emergency personnel.

40 Claims, 20 Drawing Sheets

Latitude/Longitude Parameters Pushed to ESNE by a) handset, b) base station, or c) network PDE Latitude/Longitude Parameters Pushed to ESNE by a) handset, b) base station, or c) network LMU

Approximate Land Coverage Projection:  One Pixel: .005°Lat x .005°Lon

Entire Map: 1832 to 1499 Square Miles (across lower 48 states)

One Pixel: .112 to .091 Square Miles (across lower 48 states)

Examples of Surveillance Areas:

Las Vegas Metropolitan Area: est. 5904 pixels or 36% Map

Inside Washington, D.C. Beltway: est. 4000 pixels or 24.4% Map

New Orleans Superdome Area: est. 2 pixels or .01% Map

**Approximate Land
Coverage Projection:**

1 Pixel = .000156 ° Lat x .000156 ° Lon

1 Pixel = approx. 2483.5 to 3035 square feet (lower 48 states)
Typical Handheld GPS Unit Mean Accuracy: 5ft.(GIS grade) to 25 ft. (recreation grade)
Typical A-GPS Handset Error: 22 meters or 72.16 ft. (mean error over 6 mo. FCC test in 1999)
FCC Limits for Handset Error: 50 meters (67%)/100meters (95%)
FCC Limits for Network Error: 100 meters (67%)/150 meters (95%)

LSAM LEVEL NR.

(1)  Pixel = .3200°Lat x .3200°Long (2)  Pixel = .1600°Lat x .1600°Long (3)  Pixel = .0800°Lat x .0800°Long (4)  Pixel = .0400°Lat x .0400°Long (5)  Pixel = .0200°Lat x .0200°Long Pixel = .0100°Lat x .0100°Long (6)

Pixel = .000156°Lat x .000156°Long

LSAM Level 1 Map Set

Absolute Origin Coordinates
Lat (Y0), Long (X0)

| LSAM LEVEL | DECIMAL LSAM NR. COMBINATIONS | BINARY LSAM NOMENCLATURE |
|---|---|---|
| 1 | X | 3 Bits |
| 2 | XX | 6 Bits |
| 3 | XXX | 9 Bits |
| 4 | XXXX | 13 Bits |
| 5 | XXXXX | 16 Bits |
| 6 | XXXXXX | 19 Bits |
| 7 | XXXXXXX | 23 Bits |
| 8 | XXXXXXXX | 26 Bits |
| 9 | XXXXXXXXX | 29 Bits |
| | X = 1, 2, 3, OR 4 | |

LSAM Level 1 Map Set

| LSAM LEVEL (n) | 1 | 2 | 3 | 4 | 5 | 6 | 7 | 8 | 9 |
|---|---|---|---|---|---|---|---|---|---|
| LSAM NR. (x) | X | X | X | X | X | X | X | X | X |
| $\dfrac{X}{1}$ | \multicolumn{9}{c}{$\Delta Lat_n / \Delta Long_n$} | | | | | | | | |
| 1 | 0 | 0 | 0 | 0 | 0 | 0 | 0 | 0 | 0 |
| 2 | 0/.3200 | 0/.1600 | 0/.0800 | 0/.0400 | 0/.0200 | 0/.0100 | 0/.0050 | 0/.0025 | 0/.00125 |
| 3 | .3200/0 | .1600/0 | .0800/0 | .0400/0 | .0200/0 | .0100/0 | .0050/0 | .0025/0 | .00125/0 |
| 4 | .3200/.3200 | .1600/.1600 | .0800/.0800 | .0400/.0400 | .0200/.0200 | .0100/.0100 | .0050/.0050 | .0025/.0025 | .00125/.00125 |

$$\Delta LAT / \Delta LONG \Big|_{LSAM\ x}^{LSAM\ xxxxxxxx} = \sum_1^n \Delta LAT_n / \sum_1^n \Delta LONG_n$$

1. Property 1 (LSAM) = LSAM XXXXXX212 + LSAM XXXXXX214 + LSAM XXXXXX221 + LSAM XXXXXX223

| 00000000 | 00000111 | 00000000 | 11111100 |
| 00000000 | 00000111 | 00000000 | 11111100 |
| 00000000 | 00000001 | 00000000 | 11111100 |
| 00000000 | 00000001 | 00000000 | 11111111 |
| 00000000 | 00000000 | 00000000 | 01111111 |
| 00000000 | 00000000 | 00000000 | 01111100 |
| 00011111 | 00000000 | 11000000 | 00011100 |
| 00011111 | 00000000 | 11000000 | 00011000 |

2. LSAM XXXXXX322 = Property 4 (partial) + Property 5a (partial)

| 00000000 | 00011100 |   | 00011100 |
| 00000000 | 00011100 |   | 00011100 |
| 00000000 | 00011100 | = | 00011100 |
| 00000000 | 00011100 |   | 00011100 |
| 00000000 | 00011100 |   | 00011100 |
| 00000000 | 00000000 |   | 00000000 |
| 00000000 | 00000000 |   | 00000000 |
| 10000000 | 00000000 |   | 10000000 |

VARIABLE 1 THROUGH VARIABLE 8 LSAM DATABASE

| 1 LSAM ($n_0$) | 2 $LAT_{REF}$ | 3 $LONG_{REF}$ | 4 $\Delta LAT$ | 5 $\Delta LONG$ | 6 LSP/MLU | 7 LSP Authen Date | 8 LSAM Security Override |
|---|---|---|---|---|---|---|---|
| $n_0$ = xxxxxx | .0000-.6400 | .0000-.6400 | .0100 | .0100 | 10 digits | Mo/Day/Yr | 1--Not Authorized<br>2--LSP Authorized<br>3--MLU Data Authorized<br>4--MLU Var. 13 Authorized |
| . | . | . | . | . | . | . | |
| . | . | . | . | . | . | . | |
| . | . | . | . | . | . | . | |
| . | . | . | . | . | . | . | |
| . | . | . | . | . | . | . | |
| . | . | . | . | . | . | . | |
| . | . | . | . | . | . | . | |
| . | . | . | . | . | . | . | |
| $n_0$ = xxxxxxxxx | | | .00125 | .00125 | | | |

FIG. 18A

VARIABLE 9 THROUGH VARIABLE 12 = PIXEL MAP$_{LSAM(n0)}$ ATTRIBUTES

| 9 Pixel Nr. | 10 Customer Code Nr. | 11 LAP Nr. | 12 Authentication Date |
|---|---|---|---|
| Pixel 1 | 0 to 64 | 10 digit nr. | Mo/Day/Yr |
| . | . | . | . |
| . | . | . | . |
| . | . | . | . |
| . | . | . | . |
| . | . | . | . |
| . | . | . | . |
| Pixel 64 | . | . | . |
| | ( 0 or Special Code for No Customer in Pixel) | | |

FIG. 18B

VARIABLE 13 THROUGH VARIABLE 18 = LSU CACHE FOR 911 CALLS

| 13 MS Callback Nr. | 14 MS Lat/Long | 15 LSAM (n₀) | 16 Call Initiate Time | 17 Call Complete Time | 18 MLU Nr. |
|---|---|---|---|---|---|
| 10 digit nr. | 0-.6400/0-.6400 | LSAM (xxxxxx) | True Mil Time | True Mil Time | 10 digit nr. |
| . . . . . . . . . | . . . . . . . . . | . . . . . . . . . | . . . . . . . . . | . . . . . . . . . | . . . . . . . . . |
| | | LSAM (xxxxxxxx) | | | |

FIG. 18C

LOCALIZED CELLULAR AWARENESS AND TRACKING OF EMERGENCIES

CROSS-REFERENCE TO RELATED APPLICATIONS

This application claims the benefit of U.S. Provisional Patent Application No. 60/484,477 filed Jul. 2, 2003 in the U.S Patent and Trademark Office, the disclosure of which is incorporated herein by reference.

BACKGROUND OF THE INVENTION

1. Field of the Invention

The present invention relates to methods and devices for mobile telecommunications systems and, more particularly, to methods and devices for locating and providing enhanced response to an emergency identified by a 911 mobile telecommunications caller.

2. Description of the Related Art

A mission of a 911 emergency system is to provide, in the shortest possible time, a response team well informed concerning an emergency and composed of emergency personnel having the appropriate skills to respond to the emergency. Today, the threat of a sudden terrorist attack and criminal violence against any part of our society (e.g., by snipers, gunmen, bombers, and those seeking to unleash weapons of mass destruction including quantities of biological agents, toxins or radiation), places the utmost importance on providing a quick and thoughtfully assembled response team of law enforcement, emergency medical service, and other emergency personnel to prevent catastrophic damage or loss of life. One key to a quick and properly formulated emergency response lies in the accuracy and speed of passage of information concerning the emergency to the appropriate emergency personnel, including dedicated on-site security personnel.

Many resources have been committed to better intelligence, increased security around high profile targets, border security, first responder equipment and training, etc. However, one defense asset that has not been fully exploited at this time is the national cellular system. The "eyes and ears" of the millions of mobile phone users in this country are an existing resource for round-the-clock surveillance across the entire nation. To benefit from this surveillance, all security personnel and law enforcement must be better networked to provide a faster reactionary force against terrorist or criminal attacks. As discussed herein, it is possible to significantly improve the responses to a 911 call and also allow for additional services in both distributed and centralized awareness and tracking of all types of emergencies.

A typical scenario for receiving a wireless 911 call on a cellular network system in response to a threat is illustrated in FIG. 1A. FIG. 1A illustrates a basic 911 wireless cellular response scenario in which a 911 caller talks to a 911 dispatcher who locates the caller through discussion and review of available location data, interprets the emergency, and then notifies the appropriate first responder organization. The response time to arrive at the location of the 911 caller is dependent on the technology of the 911 dispatch center and the readiness and location of the actual response team.

In particular, in FIG. 1A, a 911 call 6, made by a person 8 in response to a threat 10, is transmitted to a cellular tower 12. The 911 call 6 is then routed to a 911 dispatcher 14 who receives the 911 call, speaks with the person 8 and, in turn, relays the nature of the emergency to emergency personnel such as those at a police station 16 and others 18, for example, those at a fire station. Also, the 911 dispatcher 14 may directly contact individual police or security officials 20 via, for example, radio communication 22, or the security officials may instead be contacted by, for example, a police station dispatcher such as by radio communication 22', adding an additional layer of communication. Once the 911 dispatcher 14 understands the emergency and contacts appropriate first responder organizations, calls may or may not be made to on-site personnel. Thus, significant delays can occur before an emergency is actually dealt with. However, it will be appreciated that across the United States, the technical sophistication of the 911 dispatch and the emergency personnel organizations can vary from highly networked/computerized centers to low-budget operations adding additional decision and communication time and even introducing the possibility of communication errors.

In the past, the biggest problem with an emergency call from a cellular phone was that the 911 dispatcher did not know the location of the caller, who frequently could not provide adequate location information. In an effort to improve the response time for wireless 911 calls, the Federal Communications Commission (FCC) has promulgated enhanced 911 (E-911) mandates, which provide each 911 dispatcher with automatic location identification (ALI) (i.e., additional geographic location information) on the wireless 911 calls. The basic 911 rules require wireless carriers to transmit all 911 calls to a Public Safety Answering Point (PSAP) 254 (see FIG. 4) without regard to subscriber validation, and all wireless handsets must have the capability to process 911 calls such that the calls may be handled by any available carrier.

The E-911 program has evolved in two phases. The E-911 Phase I program required that by 1998, the carrier had to be capable of providing the PSAP 254 with the telephone number of the 911 caller and the location of the cell site or base station (BS) receiving the call. This is typically done by the wireless provider furnishing the PSAP 254 with the antenna face sector width and range characteristics for plotting on geographic information system (GIS) maps so that notification by the mobile switching center (MSC) to the PSAP of the affected antenna face allows the PSAP 254 to observe the location area for the 911 caller calling from a mobile system (MS), although, the precise location of the emergency must be supplied by a description from the caller.

The Phase II Program requires that the location of a wireless 911 caller is to be identified, without a description from a wireless 911 caller, by providing the PSAP 254 with the geographic location coordinates of the 911 caller. This may be achieved by precision ranging measurements combined with sophisticated algorithms for the accurate calculation of latitude and longitude of the MS. The Phase II program allows the carrier to achieve 95% of subscriber usage of ALI handsets by December 2005, or 50% of coverage area with network-based ALI accuracies by October 2001 (with 100% coverage area at a later approved date).

The ALI location accuracies for the E-911 Phase I program are typically met by the cellular network notifying the PSAP of the base station, cell, or antenna sector that is receiving the 911 call. The PSAP 254 uses this information along with additional information about the shape and range of the particular cellular coverage area to approximately locate the 911 caller. The location of the caller is greatly improved in the E-911 Phase II system by requiring very precise ALI location accuracies, including handset ALI solutions with 50 meters location accuracy for 67% of calls and 150 meters for 95% of calls, and network-based ALI solutions with 100 meters location accuracy for 67% of calls and 300 meters location accuracy for 95% of calls. It should be noted, however, that Phase II ALI compliance can be met by many different techniques for locating a wireless 911 caller, including either a BS network measurement (e.g., time difference of arrival, angle of arrival, signal pattern matching, etc.), handset measurement using, for example, assisted global positioning satellite (a-GPS) or enhanced observed time delay (EOTD), or hybrid combinations of the measurement techniques.

Each technique for locating a wireless 911 caller has many technological issues that limit its usefulness or application within the U.S. However, a-GPS and hybrid solutions are considered today to be the most promising solutions, particularly with regard to reception in urban locations and buildings. It is also expected that the handset ALI accuracies will be well within FCC requirements, as evidenced by a six-month test by the FCC in 1999 that resulted in an average accuracy of 22 meters. As reported in the March 2003 *GPS World Magazine*, more than 10 million handsets with built-in GPS chipsets have been sold in the previous 18 months and hundreds of millions of handsets with GPS are expected within the next several years because of the E-911 mandate.

The goal of the FCC since 1996 has been to improve the process of locating the 911 caller through the E-911 mandates for ALI technology. Precise location of the 911 caller significantly improves the response time of an emergency team to the site of the 911 caller. However, the addition of the present invention (also referred to as the Localized Cellular Awareness and Tracking of Emergencies (LoCATE) System) will allow a much faster initial response by on-site security or nearby law enforcement while the emergency team is in transit. In the case of terrorist or criminal attack, the result could be significantly reduced loss of life or property due to the ability to capitalize both on a real-time communication link to on-site security/law enforcement and the ability to tailor on-site surveillance zones for optimum responses to an expected attack.

While, as described above, efforts are underway to reduce the time required to identify a location of a wireless 911 caller and to route the call to a particular emergency agency in a particular service zone, it is seen that a further effort is required to provide, in the shortest possible time, a response team well informed concerning an emergency and that is composed of emergency personnel having the appropriate skills to respond. A special consideration for terrorist attack or any situation where human life is highly endangered is the notification of on-site security personnel which typically are not highly prioritized in the 911 dispatch process. In addition to improving the response time of emergency personnel, the invention, summarized below, would allow a cellular provider to recover costs through a fee-for-service to security organizations in businesses and institutions.

SUMMARY OF THE INVENTION

It is an aspect of the present invention to provide a method and device that informs authorized law enforcement or security personnel of a nearby 911 emergency while the 911 caller is actually reporting the incident to a 911 center on his or her cellular phone (i.e., mobile system).

It is also an aspect of the present invention to provide wireless units that connect to the emergency cellular system and receive 911 calls from wireless handsets located within a selected area described by a precise map of Global Positioning System (GPS) coordinates.

It is a further aspect of the present invention to provide a method and system of correlating the location of a 911 caller in an E-911 system with the location of nearby authorized first responders to achieve the fastest possible response to an emergency. The present invention provides the ability to inform either on-site security or nearby law enforcement of a 911 call in progress by linking the on-site or nearby security or law enforcement to both the 911 caller and the 911 dispatcher.

The above aspects can be attained by providing, in accordance with an embodiment of the present invention, a method of initiating a telecommunication connection between a wireless 911 caller, an emergency 911 dispatcher, and at least one emergency personnel includes identifying a geographical location of a wireless 911 caller; identifying at least one emergency personnel located proximal to the geographical location of the wireless 911 caller; and initiating a telecommunication connection between each of the wireless 911 caller, an emergency 911 dispatcher and the at least one emergency personnel.

The above aspects can be attained by providing, in accordance with another aspect of the present invention, a mobile switching center for a cellular telephone system includes an authentication database containing data for authenticating a telephone handset of at least one emergency personnel. A locate database contains data relating at least one telephone number to the handset of the at least one emergency personnel. A main controller communicates with the authentication database and the locate database. The main controller may comprise a locate module that is configured to identify a geographical location of a wireless 911 caller, identify at least one emergency personnel located proximal to the geographical location of the wireless 911 caller, and initiate a telecommunication connection between each of the wireless 911 caller, an emergency 911 dispatcher, and the at least one emergency personnel.

The present invention provides additions to the wireless network that allow surveillance systems to greatly reduce the time to respond to crimes or terrorist attacks and may be used to assist local government and state and national agencies in the surveillance of important assets and events, or may be used by large businesses or institutions to increase the response effectiveness of on-site security to 911 emergencies of all types, particularly crimes or terrorist attacks.

BRIEF DESCRIPTION OF THE DRAWINGS

Other aspects and advantages of the invention will be evident to one of ordinary skill in the art from the following detailed description made with reference to the accompanying drawings, in which:

FIGS. 18A–18C illustrate database parameters according to the present invention.

DETAILED DESCRIPTION OF THE PREFERRED EMBODIMENTS

The time required for emergency personnel to arrive at an emergency may be extended by delays in communication created by separate communications between a 911 dispatch operator and emergency dispatchers, such as a police dispatcher, or emergency personnel and possible communications between the emergency dispatchers and the emergency personnel. Additionally, there is the frequent lack of a prioritized communication link with on-site security personnel who could provide the most immediate response to a dire emergency.

Accordingly, the present invention provides a method and system that significantly reduce the delays created by the relaying of information between 911 dispatchers and emergency personnel (as used herein, the term "emergency personnel" refers to official emergency responders including police, fire, emergency medical personnel, or authorized on-site personnel based upon the official priorities established for the particular geographic location). In particular, in one embodiment of the present invention a cellular system allows for the initiation of a telecommunication connection between each of a wireless 911 caller, an emergency 911 dispatcher, and at least one emergency personnel located proximal to the wireless 911 caller.

Figures 2A, 2B:
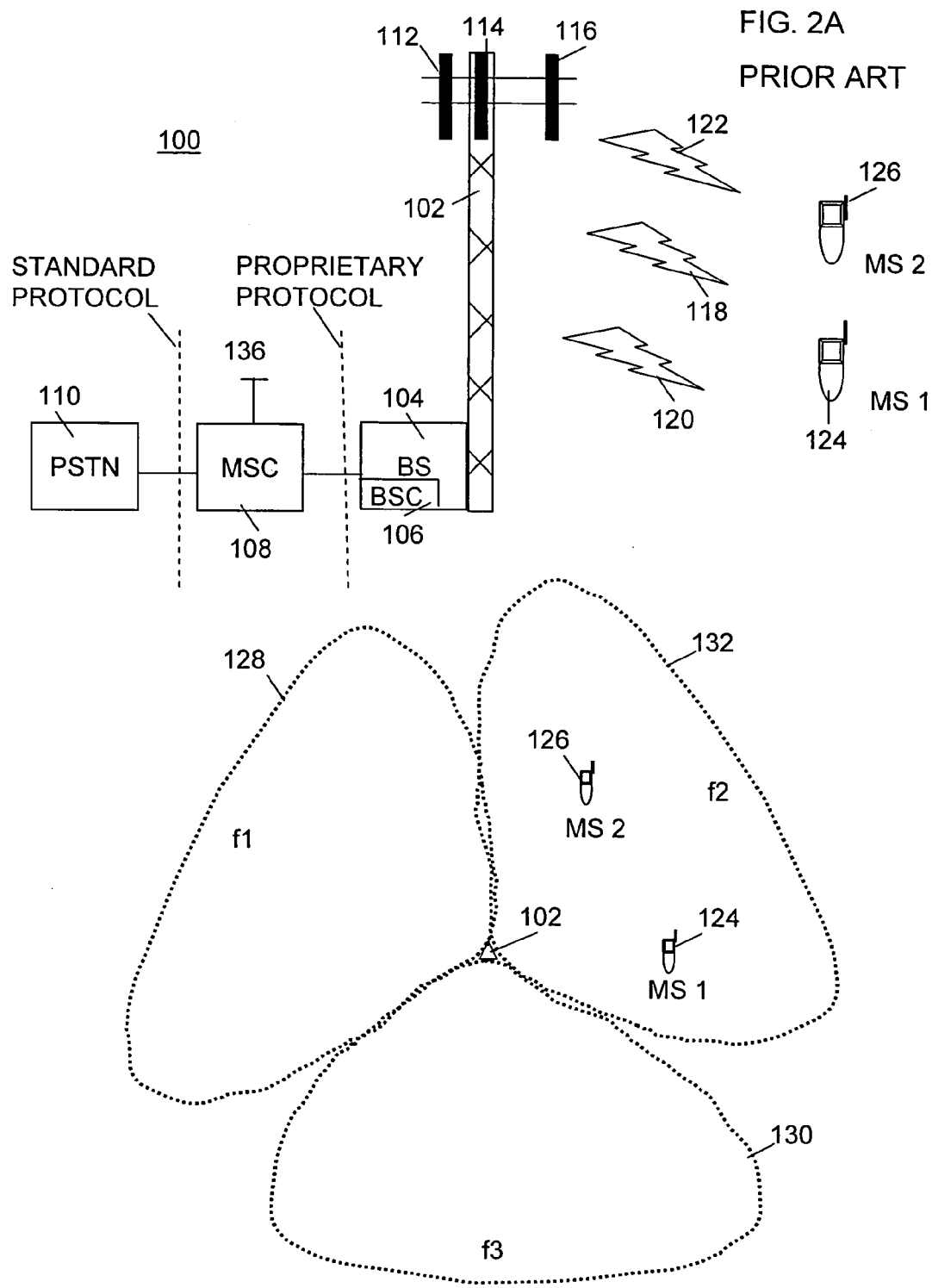
FIG. 2A is a schematic diagram of a conventional cellular network.
FIG. 2B is a schematic diagram of a communication field pattern of a cellular tower shown in FIG. 2A.

Referring to FIG. 2A, a cellular system is illustrated generally at 100. In this embodiment, the cellular system 100 includes a cellular tower 102 located at a base station (BS) 104, a base station controller (BSC) 106, a mobile switching center (MSC) 108, and the public switching telephone network (PSTN) 110.

The cellular tower 102 may be located at any suitable location such as on top of a mountain and may include multiple emitters 112, 114, 116. Each emitter 112, 114, 116 may output multiple signals including, for example, a control channel 118 and voice channels 120, 122 for communicating with plural wireless cellular telephones, sometimes referred to herein as cell phones, mobile systems, or handsets 124, 126. Referring also to FIG. 2B, each of the emitters 112, 114, 116 may cover a separate sector 128, 130, 132, each of which may differ in a known manner by frequency or code depending on whether the cellular system 100 employs an analog or a digital format and, also in a known manner, on the particular radio access technology of the cellular system 100. Examples of radio access technology systems include frequency division multiple access (FDMA), time division multiple access (TDMA), code division multiple access (CDMA), and space division multiple access (SDMA). The newer 2.5 generation and the proposed 3.0 generation cellular systems typically use advanced evolutions of the previously mentioned TDMA and CDMA technologies. Where the cellular system 100 does not have a capability to calculate latitude and longitude of a handset, the identification of a sector 128, 130, 132 as a whole may be the smallest cellular unit area in which the location of handsets 124, 126 may be identified. However, it will be appreciated that SDMA technology allows that a sector may be divided into additional smaller cells, further reducing the geographical size of the smallest cellular unit area, the advantages of which are described in more detail in connection with FIGS. 1B and 1C.

Referring again solely to FIG. 2A, the base station 104 may include a transmitter and a scanning receiver that are connected in a known manner to the base station controller 106. The base station controller 106 may be housed at the same location as the base station 104 or may be located some distance away and, although not shown as such, may control multiple base stations as in Global System for Mobile Communication (GSM) networks. The base station controller 106 may comprise a processor and a working storage and a permanent storage and operates to receive data input concerning various handsets 124, 126 from the mobile switching center 108, as described in more detail below. The base station controller 106 may also provide local control over a base station 104 including establishing control channel 118 and voice channel communication 120, 122 with various handsets 124, 126. The base station controller 106 may also be, in some cases as described above, configured to establish a particular geographical location of a cell phone 124, 126 through use of various techniques such as time difference of arrival, angle of arrival, and signal pattern matching, or in combination with information provided by a handset such as assisted global positioning satellite (a-GPS).

The base station controller 106 may communicate via any suitable communication link such as a wire, a fiber optic system, or a microwave system, with the mobile switching center 108 (as used herein the term "link" may represent any of the preceding communication mediums). The mobile switching center 108 will be described in more detail below and may operate to provide authorization information concerning handsets 124, 126, high level command and control over multiple base station controllers 106 via link 136, and interface with wired telephone locations, satellite systems, and other cellular systems in the public switched telephone network 110.

In a known operation of the illustrated cellular system 100, a cell phone 124, 126 may gain access to the cellular system through communication on the control channel 118 with the base station controller 106, which, in turn, may communicate with the mobile switching center 108, for example, for requesting authorization of the cell phone. Once authorization is obtained for the cell phone by the mobile switching center 108, the base station controller 106 may select a particular channel for voice channel communication 120, 122 depending on, for example, availability. Dialing access and voice communication may then be initiated by the cell phone caller (not shown).

Figure 3:
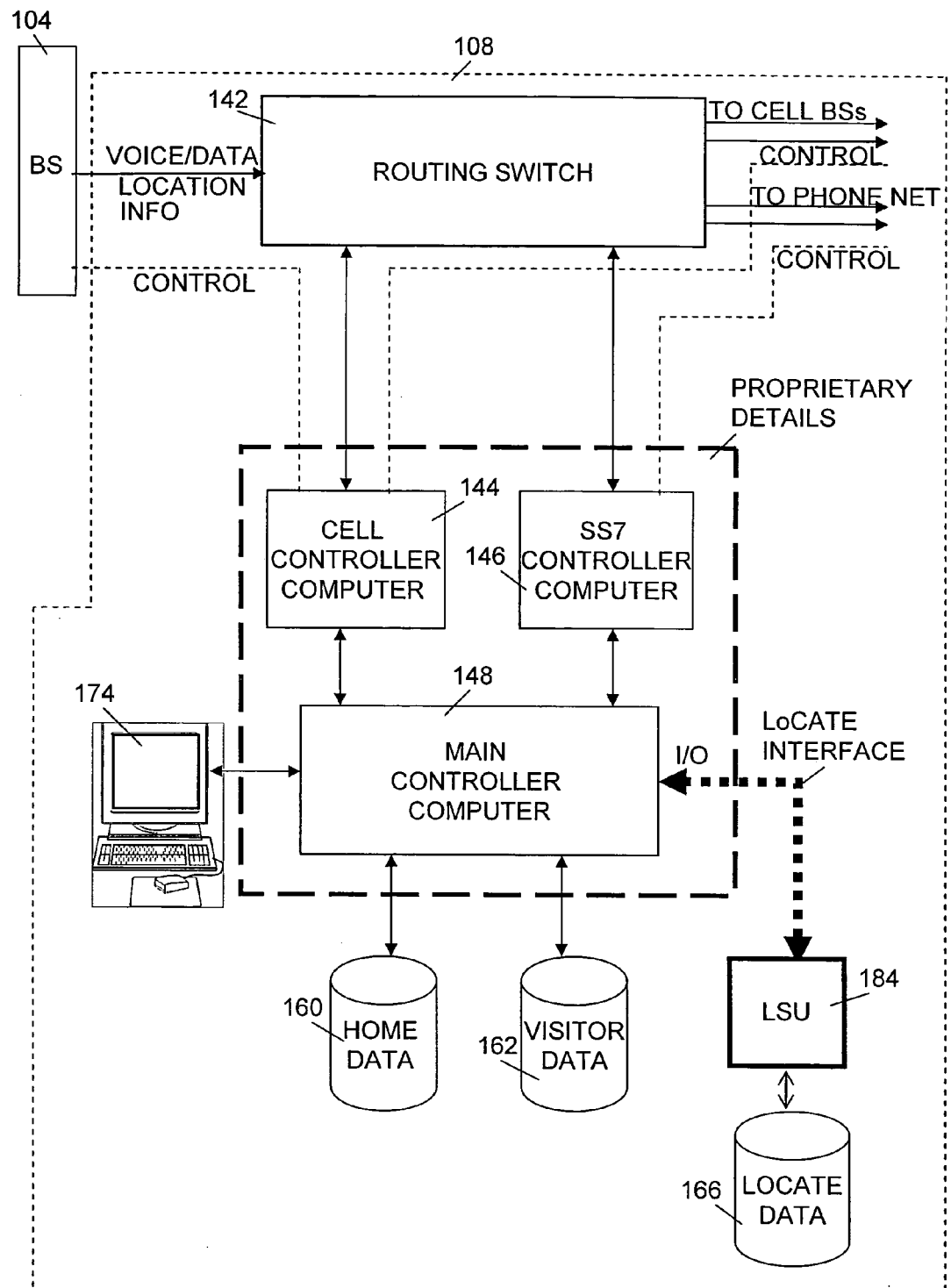
FIG. 3 is a schematic diagram of a mobile switching center shown in FIG. 2A according to the present invention.

An MSC 108 is shown in FIG. 3, including the interface with the present invention. The MSC 108 is responsible for receipt and routing of all calls from the MSs 124, 126 in the cellular network 100. The MSC 108 receives all MS 124, 126 calls from the BSs 104 under its control and is responsible to route these calls to other BSs and MSs in the network 100, as well as connect to the PSTN 110 or dedicated servers, routers, or tandems available for specialized purposes. The heart of the MSC 108 is the main controller computer 148, which performs all the major management operations required to allow an authorized subscriber/visitor MS 124, 126 to make calls from within the cellular coverage area. The cell controller computer 144 is dedicated to the routing of calls within the cellular network 100 and the SS7 controller computer 146 is dedicated to routing of calls outside the cellular network 100 to other cellular networks, the PSTN 110, and dedicated servers (packet switching with internet protocol) or routers.

Due to data transmission features of newer (2.5 generation) and future (3 generation and beyond) wireless phones, the cell controller computer 144 and the SS7 controller computer 146 will add additional capabilities to control both base station 104 operations as well as interfaces to new or out-of-network entities that operate under internet protocol (IP) to route data packets to their destination addresses with various monitoring protocols to oversee the sequence and delivery of packets (transmission control procedure, TCP being the most common). The high data rates, packet switching design, and full TCP/IP (transaction capabilities protocol/internet protocol) requirements of 3 generation (3G) networks will integrate totally new hardware from end-to-end (BS to PSTN) to deal with packet storage/routing, and broadband data such as video. However, the traditional MSC role of controlling circuit switching voice telecommunications will continue with the sharing of hardware, operations, and the various authentication databases (HLR, VLR, etc.). J-STD-036 (as discussed below) ensures that the E-911 Phase 2 mandate can be completed during the significant design changes that are ongoing to support 3G operation in the future. The present invention as described herein does not require packet switching or high data rates to operate, and can operate with simple digital bit coding and transmission limitations of current technologies.

The main controller computer 148 also receives data from the MSs 124, 126 connected to the network 100 and compares the information to either network or national databases that verify that each caller MS 124, 126 is an authorized customer (using the home database 160) and that other callers using the wireless network (via the visitor database 162) are authorized to make calls. Additionally, the MSs 124, 126 contain electronic chips that authenticate the hardware for use in the network. The home database 160 and the visitor database 162 contain data that uniquely identify whether a particular handset 124, 126 is currently authorized for use on the cellular system 100. Wireless handsets may be validated in these databases whenever access to the cellular system 100 is attempted. However, the FCC has mandated that the handset utilized by a 911 caller must be accepted by the closest available tower regardless of authorization status.

The routing switch 142 of the MSC 108 operates to route communications between the various controllers such as the base station controller 106, the cell controller 144, other base station controllers (not shown), the SS7 controller 146, and the public switched telephone network 110, which includes links to hardwired, satellite, or other cellular telephone systems (not shown). The cell controller 144 may include a processor with a working and a permanent storage (not shown) and may communicate with the base station controller 106 to control switching between handsets 124, 126 for the purpose of establishing voice and/or data communications (provided the cellular system 100 and handsets 124, 126 are configured to transmit both). The SS7 controller 146 may also include a processor with a working and a permanent storage (not shown) and may operate to provide standardized intersystem signaling using telephone numbers between the cellular system 100 and hardwired telephone systems, satellite systems, or other cellular telephone systems (not shown).

The main controller 148 may further include a processor with a working storage and a permanent storage (not shown). An input device 174, such as a personal computer, may be provided for accepting operator input to the main controller 148 to vary database contents, as well as operational and maintenance instructions.

The main controller 148 may, in some cases, be configured via a module (not shown) to communicate with the base station controller 106 and, in turn, base station 104 to identify with particularity a geographical location of a cellular handset 124, 126 using known techniques of, for example, time difference of arrival, angle of arrival and signal pattern matching, or in combination with information provided by a handset 124, 126 such as assisted global positioning satellite (a-GPS). Also, the cellular provider may optionally instruct the cell controller 144, the SS7 controller 146, the main controller 148, and the routing switch 142 to transmit 911 caller location information to the 911 dispatch center in a totally proprietary manner, which could include partitioning in the routing switch 142 or even providing a second routing switch specifically dedicated to 911 dispatch.

In accordance with an embodiment of the present invention, the main controller 148 may be configured via a LoCATE System Unit (LSU) 184 to provide for the initiation of a telecommunication connection between each of a wireless 911 caller, an emergency 911 dispatcher, and one or more appropriate emergency personnel located proximal to the wireless 911 caller. The LSU 184 may include software or firmware and may utilize data stored in a locate database 166 to identify and contact one or more appropriate emergency personnel as described in more detail below. The main controller 148 may be configured via the LSU 184 to obtain the geographic location parameters of the 911 caller from the BSC 106, depending upon the location identification technique of the BSC 106 or additional network hardware operationally located between the BSC 106 and the MSC 108, at the time of the call routing to the 911 dispatch center. It will be understood that the cell controller 144 and/or SS7 controller 146 may also be configured to accomplish one or more of the operations required by the LSU-to-MSC interface.

The locate database 166 contains data for the geographical area covered by the MSC 108 concerning wireless and possibly wired telephone numbers that are associated with police officers, security personnel, emergency fire personnel, emergency medical services personnel, etc. The locate database 166 may also contain one or more priority levels associated with each of the emergency personnel. In particular, it may be advantageous to set priority levels for emergency personnel based on a hierarchy order of importance with, for example, police being at the highest priority level for geographic areas without specific LoCATE customer properties, and on-site security or police being the highest priority for geographic areas with LoCATE customer properties. It may also be advantageous to enter override instructions, for example, via the input device 174, to the LSU 184 to vary priorities of the emergency personnel contained in the locate database 166 based on the various needs of Homeland Security with approval by government authorities.

The LSU 184 may further utilize the locate database 166 along with MSC utilization of the home database 160, the visitor database 162, and the internal handset chipsets to authorize all emergency personnel handsets for the 911 caller's location, authorize all emergency personnel wireless handsets for use with the LSU, and authenticate the actual handset hardware as legitimate serial numbers prior to establishing the telecommunication connection between each of a wireless 911 caller, an emergency 911 dispatcher, and the highest priority emergency personnel located proximal to the wireless 911 caller.

It will be appreciated that the E-911 Mandate Phases and associated cellular system 100 waivers may affect the positional accuracy and speed of the LSU 184 to identify the location of the 911 caller and all proximal wireless emergency handsets. Therefore, the LSU 184 and the locate database 166 may be updated from identifying 911 calls from a minimum cellular area, defined by BS, tower, or sector, to identifying 911 callers within a mapped area bounded by latitude and longitude parameters, for example, by GPS coordinates. It will be further appreciated that as the mapped area becomes smaller, the existence of a hardwired handset, for example, at a security desk at a business or institution, is preferred over the possibly unreliable connections to wireless handsets in buildings or urban locations.

It will be understood that many cellular systems 100 lack the ability to connect more than three separate parties in a conference call. Where available, several approaches may be used to allow communication with emergency personnel at the same time as the 911 call. For example, a first emergency person having the authorized LoCATE handset may utilize a packet phone and a data message could be sent to other appropriate emergency personnel as the first emergency person listens to the 911 caller or a separate phone in the public safety bands or new "direct connect" phones may be used that specifically allow walkie-talkie operation and conference capabilities up to 25 persons (reference Nextel's Direct Connect® Phones utilizing Motorola® R750 phones).

Figure 1C:
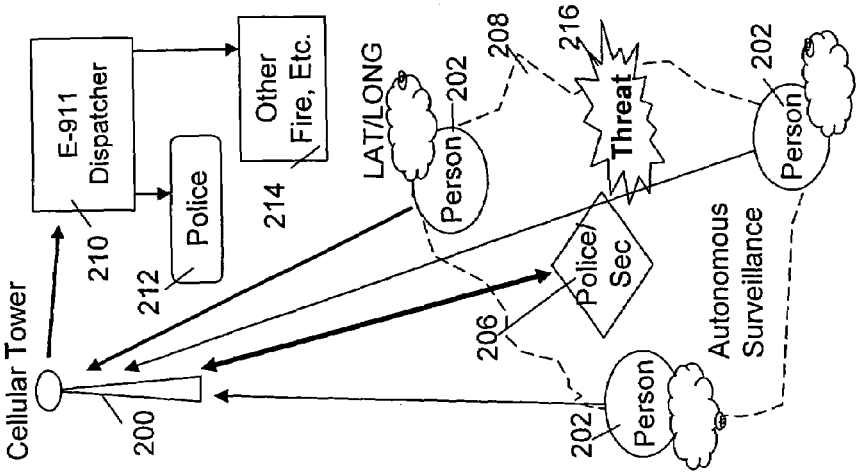
FIG. 1C is a schematic diagram of an enhanced 911 (E-911) cellular network system according to another embodiment of the present invention.
Figure 1B:
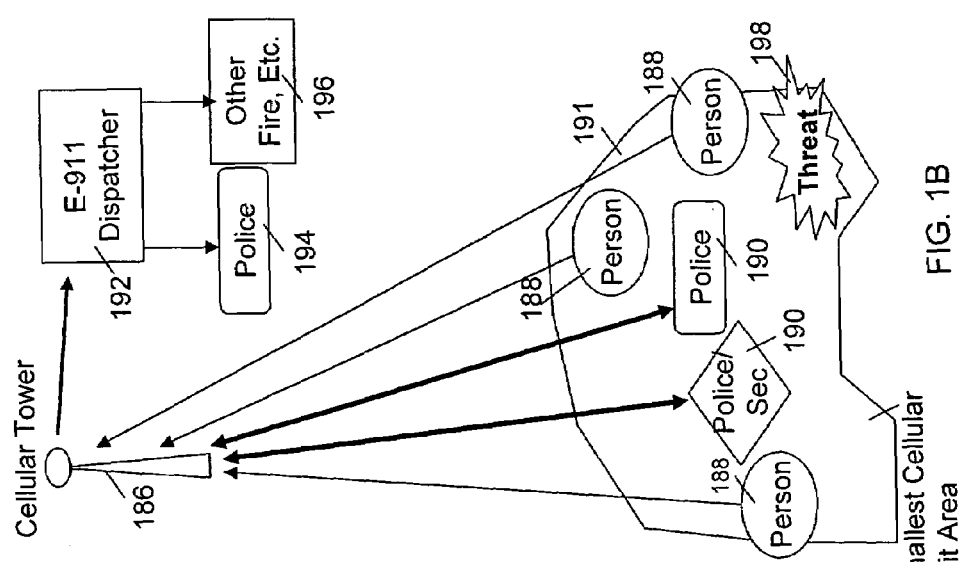
FIG. 1B is a schematic diagram of an enhanced 911 (E-911) cellular network system according to an embodiment of the present invention.
Figure 1A:
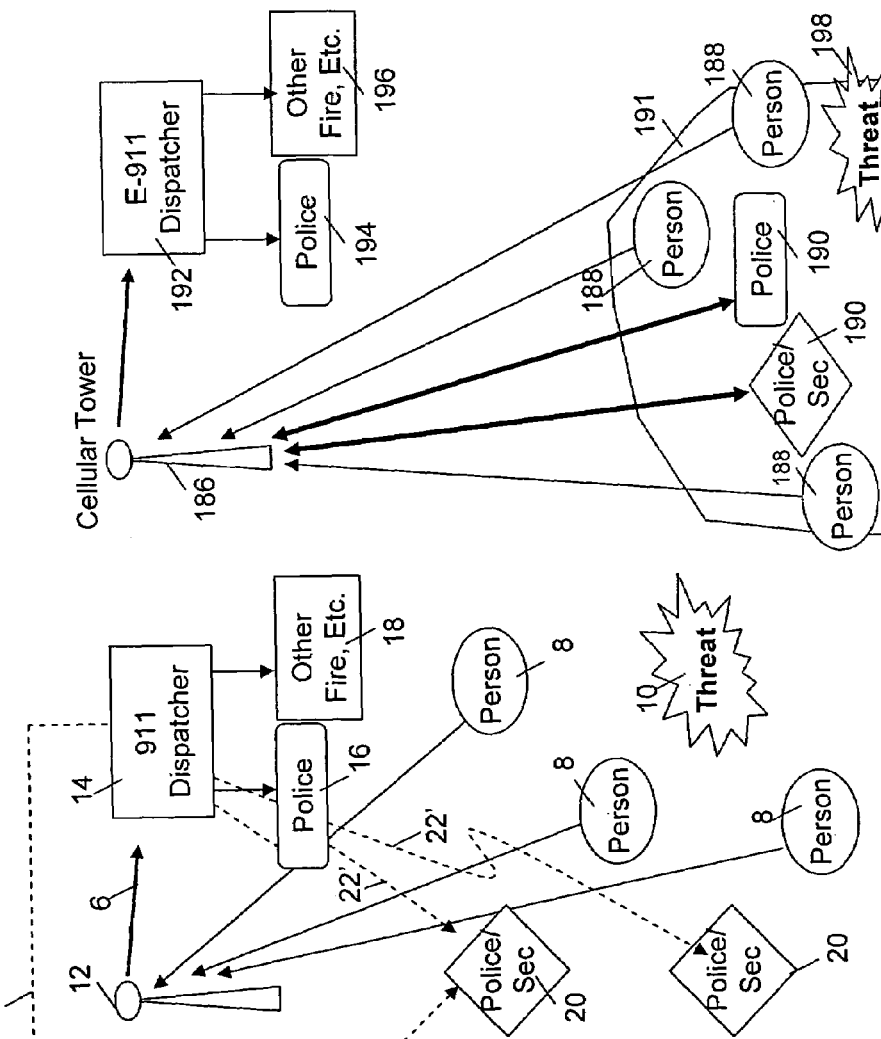
FIG. 1A is a schematic diagram of a conventional 911 cellular network system.

FIG. 1B illustrates the addition of the present invention to the E-911 Phase 1 system. The thin solid lines depict the normal communication links of the 911 call and the thicker lines depict the additional communication links provided by the present invention. In this example, the minimum cellular detection area for the LSU 184 is the same as for the E-911 ALI system and may be a base station, tower, antenna sector, "mini-cell," or "micro-cell," depending on the particular technologies employed by a cellular carrier.

As seen in FIG. 1B, a cellular tower 186 (and associated base station, base station controller, mobile switching center, etc.) is in wireless communication with a number of persons 188 having wireless handsets and one or more emergency personnel 190 also having wireless handsets, although it will be understood that the emergency personnel 190, in the case of law enforcement, may be at a fixed location and have a hard wired handset. Each of the handsets of the persons 188 and the emergency personnel 190 are authenticated by the main controller 148 and flagged by the LSU, where they are mobile, as authorized for third party contact to a 911 call within a smallest cellular unit area 191 of the cellular system 100, which is described above in connection with FIG. 2B, and may include an entire area covered by a tower or a particular sector of that tower. The cellular tower 186 is also in communication with an emergency or E-911 dispatcher 192, which, in turn, may be in communication with a police station 194 and other emergency services 196, such as a fire station, or an emergency medical services station such as a hospital.

Figure 16:
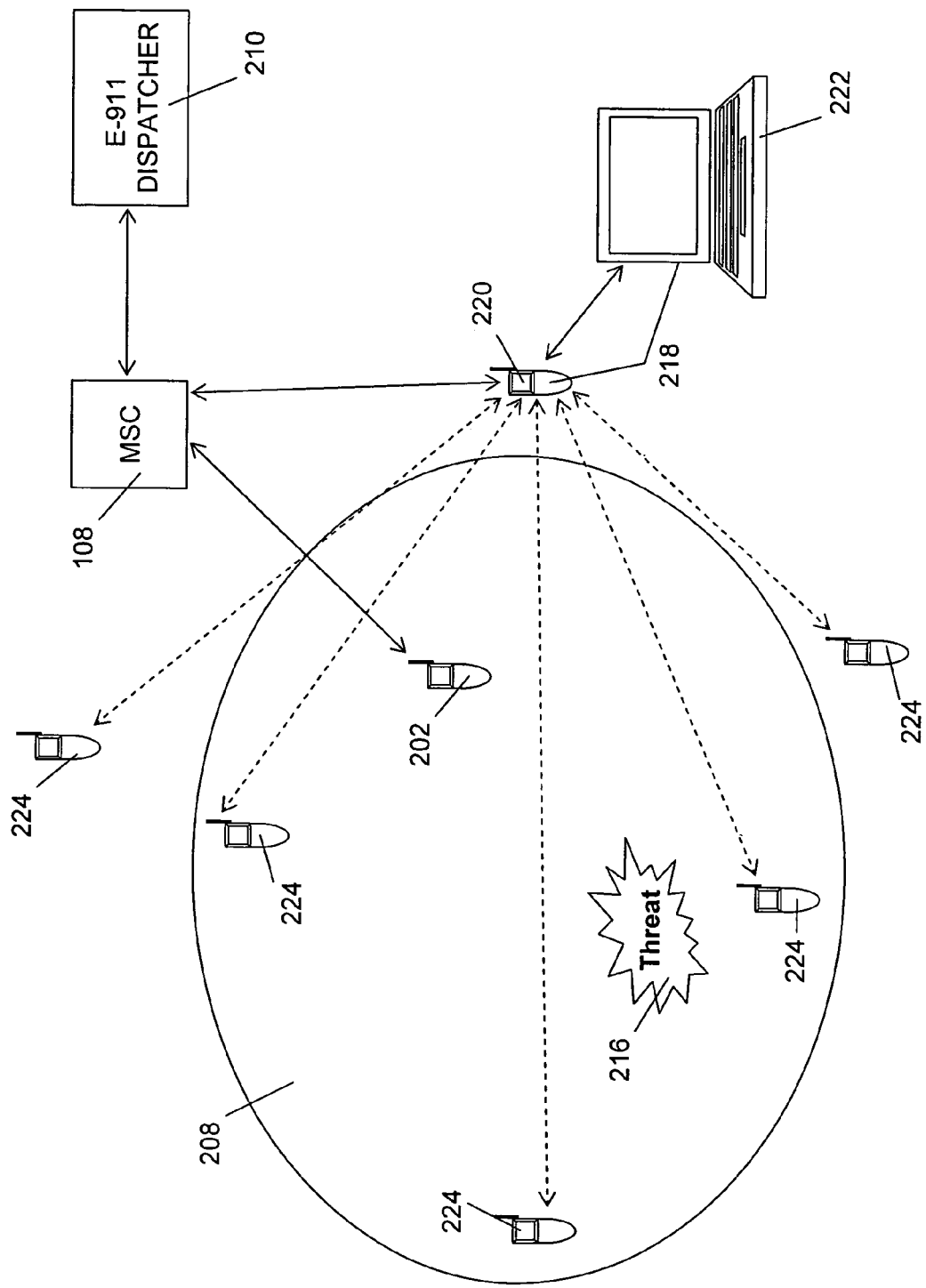
FIG. 16 is a schematic diagram illustrating a mobile locate unit integrated with police/public safety phones to receive data or voice from selected cellular surveillance areas while maintaining communication with additional phones located in the same surveillance area in accordance with yet another embodiment of the present invention.
Figure 17:
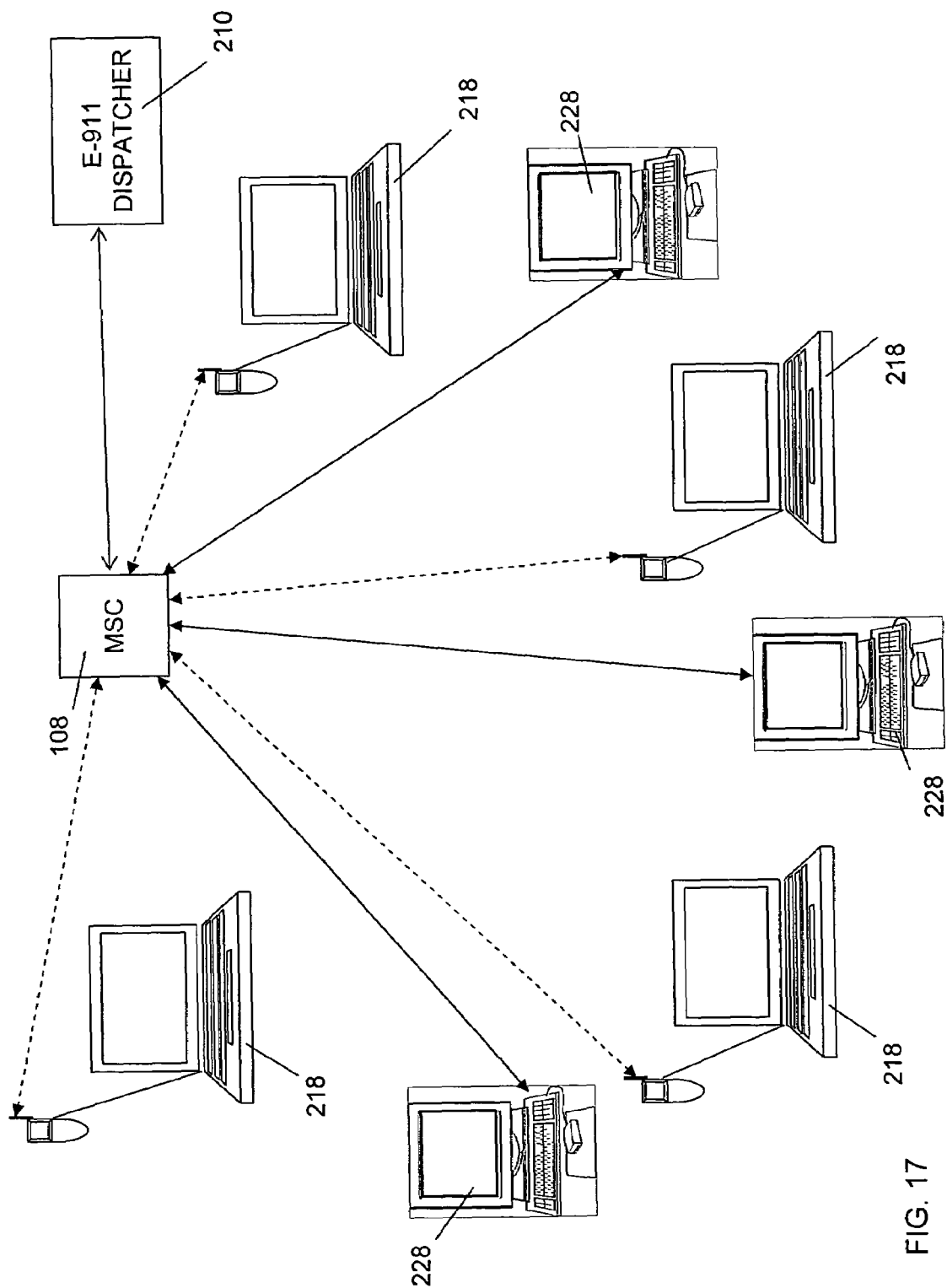
FIG. 17 is a schematic diagram illustrating a LoCATE data network for identifying wireless 911 calls made within a surveillance area and transmitting data in accordance with a further embodiment of the present invention.

In the event of a threat 198 being realized, one or more of the persons 188 may call 911 on their wireless handsets. When a 911 wireless call is initiated, the LSU 184 (FIG. 3) receives the ALI location information for the caller to identify the particular smallest cellular unit area 191, searches the locate database 166 (FIG. 3) to identify the authorized emergency personnel 190 located within the smallest cellular unit area 191, and initiates a telecommunication connection between each of the 911 caller, the E-911 dispatcher 192, and the emergency personnel 190. Advantageously, where the locate database 166 also contains priority levels, the LSU 184 may identify a highest priority level of the emergency personnel 190 and initiate the telecommunication connection on that basis. Also, where it is envisioned that a connection between the 911 caller, the E-911 dispatcher 192, and multiple emergency personnel 190 is required and the cellular system 100 lacks the ability to connect more than three parties at one time, the LSU 184 may be utilized with the LoCATE Mobile Locate Unit (MLU) 218 (described below) to connect to other emergency personnel with public safety phones or data connections to other MLUs. FIGS. 16 and 17 illustrate how additional emergency personnel 190 can receive a summary of the 911 call from a master MLU 228 (discussed below) if required by high emergency alert status.

Due to the significant positional uncertainties in the ALI information for a 911 call to the E-911 Phase 1 dispatcher, the LSU 184 allows authorized law enforcement or other first responders to be aware of an emergency in their general surveillance area. For a small minimum cellular area (e.g., a micro-cell or pico-cell), it becomes practical to include on-site security or nearby law enforcement as a fast reactionary force to an attack or other emergency. Although the E-911 Phase 1 technology is expected to be replaced by December 2005, waivers or exceptions to the Phase 2 requirements may exist that make the present invention beneficial for emergency systems using Phase 1 technology.

FIG. 1C illustrates the addition of the present invention to the E-911 Phase 2 system. The cellular system 100 of FIG. 1C has the capability of identifying a location of a 911 caller beyond identifying the particular cellular tower or tower sector at which a 911 call is received. As seen in FIG. 1C, a cellular tower 200 (and associated base station, base station controller, mobile switching center, etc.) is in wireless communication with a number of persons 202 having wireless handsets. Each of the wireless handsets of the persons 202 may include a GPS location identification capability. However, it will be understood that the present particular embodiment may contemplate use of a base station controller 106 and mobile switching center 108 that, rather than GPS capability, includes the capability to identify a geographical location of the persons 202 through the known techniques of time difference of arrival, angle of arrival, and signal pattern matching, or in combination with information provided by a handset such as assisted global positioning satellite (a-GPS).

Also communicating with the cellular tower 200 in FIG. 1C are wireless handsets of one or more emergency personnel 206. However, it will be understood that the emergency personnel 206, in the case of a security guard, for example, may be at a fixed location and have a hard wired handset. Also, in the present embodiment, each of the handsets of the emergency personnel 206 may include GPS or a-GPS capability. As described above in connection with FIG. 3, each of the handsets of the persons 202 and the emergency personnel 206 are authenticated by the main controller 148 and may be flagged, if mobile, as being within a particular smallest cellular unit area or a particular surveillance zone 208 of the cellular system 100.

In the embodiment shown in FIG. 1C, the LSU 184 and the locate database 166 may be specifically configured to apply longitude and latitude parameters for a particular surveillance area or zone 208 utilizing electronic geographical mapping (such as geographic information software) and identify the longitude and latitude parameters of all 911 calls made from the surveillance zone 208. In this particular embodiment of the present invention, specific phones for emergency personnel at LoCATE customer properties within the surveillance zone 208 may be stored in the LSU database 166 along with law enforcement or emergency personnel 206 assigned to the remainder of the surveillance zone 208. For reference purposes, specific nomenclature may be assigned to the surveillance zone 208 and refer to names of streets, parks, companies, institutions, terrorism targets, problem areas, etc., and additional priorities for receipt of all 911 call data by the LoCATE MLU 218 may be included in the LSU database 166 to accommodate government agency or Homeland Security interest in surveillance data reporting.

The cellular tower 200 of FIG. 1C is also in communication with an emergency or E-911 dispatcher 210, which, in turn, may be in communication with a police station 212 and other emergency services stations 214. In the event of a threat 216 being realized, one or more of the persons 202 may call 911 on their wireless handsets. When a 911 wireless call is initiated, the LSU 184 (FIG. 3) receives the ALI location information for the caller to identify the particular smallest cellular unit area or surveillance zone 208, searches the locate database 166 (FIG. 3) to identify the emergency personnel 206 located in closest proximity within the surveillance zone 208, and initiates a telecommunication connection between each of the 911 caller, the E-911 dispatcher 210, and the emergency personnel in the closest proximity to the 911 caller.

Advantageously, where the locate database 166 also contains priority levels, the LSU 184 may identify a highest priority level of the emergency personnel 206 and initiate the telecommunication connection on that basis. Also, where it is envisioned that a connection between the 911 caller, the E-911 dispatcher 210, and multiple emergency personnel 206 is required and the cellular system 100 lacks the ability to connect more than three parties at one time, the networks shown in FIGS. 16 and 17 may be utilized to extend the emergency personnel communication with additional MLUs for data reporting, separate voice phones in the public safety bands, or new "direct connect" phones that specifically allow walkie-talkie operation and conference capabilities up to 25 persons (reference Nextel's Direct Connect® Phones utilizing Motorola® R750 phones).

In the embodiment of the present invention shown in FIG. 1C, the minimum cellular detection area is replaced by a precise map of an autonomous surveillance area 208 programmed in the LSU 184. When a 911 call is made, the ALI coordinates of the caller are provided to the LSU 184, the correct surveillance area is chosen, and the highest priority authorized first responder phone (fixed or mobile) is connected to the 911 caller and the 911 dispatcher. At the current time, the chosen technologies for national carrier E-911 Phase 2 systems are mobile phones with electronic chipsets that incorporate either enhanced observed time delay (2-D positioning with network assistance) or assisted GPS (2-D positioning with GPS/network assistance) for fast ALI solutions. The high ALI positional accuracy of the 911 caller correlated with precise maps in the LSU 184 allows the cellular carrier to provide surveillance of 911 calls from virtually any precisely mapped area within the cellular coverage region. It becomes practical for a security force to use GPS receivers to precisely map the coordinates of land areas, buildings, water, etc. under their surveillance and provide this information to the cellular provider for programming into the LSU 184 along with the appropriate phone numbers of the security organizations.

Another particular embodiment of the present invention, which may include similar elements to those included in the embodiment of FIG. 1C, is illustrated in FIG. 16. In this embodiment, one or more emergency personnel may have a mobile locate unit (MLU) 218, which may include a handset 220 and a portable computer 222 such as a lap top or palm top computer system. It will be understood that the handset 220 is shown for illustrational purposes and may be omitted where all suitable operational aspects of the handset 220 are incorporated into the portable computer 222. The handset 220 may employ, for example, a high power (e.g., Class 1 with 30 dbm average output versus low power Class 4 with 10 dbm average output) 2.5 or 3rd generation phone (e.g., broadband data service with simultaneous voice/data) and on-board GPS chipset for a-GPS operation. This handset 220 would have longer ranges to cellular towers with improved operation over standard phones. The handset 220 may include packet data transmission capability for communicating with handsets 224, which may be capable of receiving voice and data, that are held by other particular emergency personnel within or outside of the surveillance zone 208. Simultaneous communication to additional emergency personnel may occur using public safety band phones or new direct connect phones (e.g., Motorola® R750 phones) to set up conference calls including as many as 25 phones.

The portable computer 222 receives GPS information from the handset 220 and includes electronic mapping software such as geographic information software (GIS) to map out and display the location of a handset 202 of a 911 caller responding to a threat 216. The electronic mapping software may display the geographic coordinates of a metropolitan area with full or selected topographical representation of appropriate landmarks, buildings, streets, boundaries, natural terrain, minimum cellular areas, etc., and resultant software to highlight minimum surveillance areas and associated blocks of geographic coordinates.

The portable computer 222 may also be advantageously configured along with the LSU 184, via software or firmware, to communicate with the LSU 184 to revise GPS coordinates of the surveillance zone 208, identify authorized phones in the locate database 166 based upon the revised GPS coordinates, and provide threat location and real-time updates to the E-911 dispatcher 210, to the handsets 224 of other emergency personnel, and/or other mobile locate units (FIG. 17) while the portable computer 222 or the 911 dispatcher 210 (priority established by surveillance policy) provides threat identifiers for submittal to all authorized phones. The LSU 184 and portable computer 222 may also be configured to allow movement of the mobile locate unit 218 from one surveillance zone to another surveillance zone and from communication with one base station to another base station. The LSU 184 and the portable computer 222 may further be configured to allow simultaneous communication concerning voice and data in order to, for example, receive information concerning additional 911 calls made within the surveillance zone 208.

Referring now to FIG. 17 and in accordance with a further embodiment of the present invention, multiple mobile locate units 218 are employed in conjunction with one or more master locate units 228. Each master locate unit 228 may include a computer system such as a desk top computer and may receive a combination of either data or voice from the surveillance area 208 and communicate with one or more mobile locate units 218 to receive information concerning one or more threats 216, and may communicate with one or more LSUs 184 to identify, within a given surveillance area, a total number of wireless 911 calls made within a particular cellular system 100 or cellular systems making up, for example, a municipality. A master locate unit 228 may communicate with one or more LSUs 184 to identify boundaries for a single large surveillance area or for each surveillance area including micro-cells, pico-cells, buildings, and particular areas as described above in connection with FIG. 1C.

Also, it will be appreciated that the master locate unit 228 may be located at the E-911 dispatcher location and may communicate all 911 emergencies from mobile or fixed phones denoted by the dispatcher to all mobile (or fixed) locate units 218. It is also appreciated that the master locate unit 228 may be located at a specific government agency such as a state or national Homeland Security office, FBI office, Emergency Management office, police stations, fire stations, etc. Because the master locate unit 228 is connected through the public switched telephone network 110 to the mobile switching center 108, a single master locate unit 228 may connect to multiple mobile switching centers 108 and set up a surveillance scanning network for an entire state with all reporting back to the master locate unit 228, as well as all mobile locate units 218 on a statewide basis. The master locate units 228 along with the mobile locate units 218 would provide an integrated threat/emergency management system, particularly in regards to immediate "hot spot" surveillance over large geographic areas in response to major accidents, terrorist attacks, or natural disasters such as floods, fires, hurricanes, etc.

Although details of various components of the wireless networks may be proprietary, the present invention is applicable to all wireless networks with either E-911 Phase 1 or Phase 2 technologies. Interfaces between the present invention and the wireless networks may be defined according to the general format and protocol of the appropriate industry standards. The wireless networks provide the present invention with the same data content that must be provided to meet the appropriate telecommunication standards.

The general standard for the format and protocol of the data exchange between the wireless provider network and the E-911 System is NENA (National Emergency Number Association) 02-010. The Telecommunications Industry Association (TIA) and the Alliance for Telecommunications Industry Solutions (ATIS) developed J-STD-034 to standardize the changes necessary to the wireless network to accommodate the E-911 Phase 1 mandate by the FCC. J-STD-034 provides for an Emergency Services Routing Digits (ESRD) data stream (uniquely identifying a base station, cell, or sector) that is forwarded to the PSAP 254. J-STD-036 was developed to ensure that industry meets the requirements of the FCC with regard to ALI for E-911 Phase 2. J-STD-036 provides that the additional latitude and longitude information is forwarded to the PSAP 254. The current version is J-STD-036A with Addendum 1, which provides the ELID (Emergency Location Information Delivery) protocol and message format for the currently evolved standards for wireless network interfaces in the United States, including ANSI-41 for systems utilizing CDMA (Code Division Multiple Access) and TDMA (Time Division Multiple Access) modulation techniques, and PCS-1900 for GSM (Global System for Mobile Communication).

In the present invention, the location information that is forwarded to the PSAP 254 is used to correlate the location of a MS in a 911 call to encoded digital maps of business or institution property, and search a relational database to find authorized on-site security or law enforcement phones to either link to the 911 call in progress or to be provided to a portable computer/phone unit (i.e., the MLU) that monitors the frequency/history of 911 calls (and also provides the callback number if allowed by local government) placed from the specific property. These concepts are illustrated in FIGS. 1B and 1C. However, the Phase 1 system is typically not capable of identifying a specific property perimeter, but, rather, the smallest unit of a cell that can be resolved by the wireless network. In the Phase 2 system, the location of the MS can be resolved to latitude/longitude (lat/long) coordinates within the error mandates of the FCC.

As previously mentioned, the E-911 Phase 1 mandate calls for the identification of base station, cell, or sector related to the location of the MS to be passed to the PSAP 254, along with the callback number in case the call is accidentally terminated. This is typically done by wireless provider equipment automatically when the BS to MSC connection occurs at the initiation of a 911 call. The information is transported to the PSAP 254 in a 10-digit data string called the ESRD (Emergency Services Routing Digit).

Referring to FIG. 3, the LSU 184 interfaces with the MSC 108. The ESRD, along with the 10-digit callback number, is the primary data used by the MSC 108 to provide callback number and BS/tower/sector information to the LSU 184 for searching the locate database 166 for an authorized third-party phone to connect with the PSAP 254 and the MS in a 3-way call. The particular application in a local government would require some customization as to certain options, such as (1) whether a time delay might be used to allow the PSAP 254 to get certain details before the third party is connected, or (2) use of the LSU 184 only when a sector, micro-cell, or pico-cell is addressed by the ESRD because the advantage of on-site security diminishes for a large cell or base-station.

Because the ESRD typically describes the origin of a call, it is not adequate in certain E-911 Phase 2 network scenarios where it is important to correlate data that are being routed asynchronously to various locations in the network. In these situations, the Emergency Services Routing Key (ESRK) is used to generate a 10-digit data string that applies to all data being routed to certain locations. The ESRK would also be used by the MSC 108 in these situations to route data to the LSU 184 and ensure that both the LSU 184 and the PSAP 254 reference the correct voice or lat/long data related to the MS.

The LSU 184 obtains the lat/long data from either the MSC 108 or an appropriate network position storage server (such as MPC 260 (FIG. 4) or MLC 300 (FIG. 5)), correlates the lat/long to a geodetic coordinate database that identifies the particular lat/long coordinates for the property lines (boundaries) of a business or institution, and retrieves the LoCATE Authorized Phone (LAP) number (wireless or wired network). Also, the Mobile Locate Unit (MLU) 218 (described in more detail below), can be integrated with a wireless phone (referred to as the LoCATE Security Phone (LSP)) if utilized for voice communication to transmit a coded map (LSAM) to the LSU 184 with instruction to (1) connect the phone in a 3-way voice call with the MS and PSAP 254 for any 911 call based on the LSAM, (2) identify all 911 calls in progress from the LSAM and the times of call initiation and completion, and (3) provide a list of callback numbers if allowed for homeland security purposes by local government.

The primary difference between the MLU 218 for a Phase 1 and Phase 2 network is that the Phase 1 MLU only needs to show the user a simplified GIS map with BS, cell, and sectors overlaid on the local metropolitan map, while the Phase 2 MLU needs to show the particular LSAM overlay on the metropolitan map. The MLU 218 allows the user to view the overlays on the map and request surveillance over any particular area identified on the map. For the Phase 2 network, the surveillance area can be as small as 2500 ft$^2$. A complex metropolitan, state, and national network based upon the present invention can be established to monitor businesses and institutions or a particular event. This data may be sent via an Internet protocol (IP) with appropriate monitoring protocol, typically transmission control protocol (TCP), to metropolitan, state, and national Homeland Security Offices as required to simultaneously monitor possible organized terrorism or crimes throughout the United States.

Referring to FIG. 2B, frequently in high traffic urban areas, there is further division of the cells to achieve better reuse of frequencies, which results in cells with smaller coverage areas (e.g., micro-cells or pico-cells) that may be in place to deal with specialized problems such as high numbers of people in transit (e.g., malls, airports, stadiums, large hotels, universities, etc.). This is typically done by adding more towers within a cell that are lower in height with lower power transceivers so as to further reduce the geographic area over which the new BS can actually control the MSs that are in use. Another technique involves SDMA technology, which can divide a sector into many smaller sectors, much like multiple radar beams, that either are fixed in position or move in response to received signals. Each of these techniques to reduce the cell to a smaller size results in increased traffic capacity for the cell system because it allows more towers to use the same transmission frequencies without interference. These reductions in cell size also allow for the geographic location of a 911 call to be more precisely reported within the cellular system to the BS, cell, sector, etc. It is the responsibility of the MSC 108 in both the E-911 Phase 1 and Phase 2 networks to identify the location of the 911 call to the BS, cell, or sector location.

The ESRD is generated by a hardware unit known as the Signaling Connection Control Part (SCCP) (not shown), which is added to the network 100 to allow for additional signaling during the sending of the SS7 controller 146 messages. This unit is typically activated when the BS 104 notifies the MSC 108 of a 911 call. In the E-911 Phase 1 system, the geographic location information of a MS in a 911 call is supplied by the ESRD digit string from the origination BS 104. The ESRD along with the MS callback number serve to correlate network 100 activities related to 911 calls and supply identifying information to support routing to the PSAP 254. It is possible for the ESRD or callback number to serve as the correlation and routing identifier for the network entities in an E-911 Phase 2 network. However, as previously mentioned, the ESRK is frequently used instead because its digit string is associated with the routing paths for data.

Regardless of the proprietary details of the MSC 108, it is only necessary that the MSC 108 incorporate the necessary software changes to provide the E-911 Phase 1 LSU 184 with the correct nomenclature for the MS/call combination, call origination time, BS/cell/sector identification, call completion time, and callback number (if allowed by local government for homeland security purposes). This same information is also needed by the LSU 184 for the E-911 Phase 2 system, but precise location determination requires the further inclusion of lat/long parameters before the LSU 184 can identify the particular surveillance area and the authorized on-site phone numbers as previously mentioned.

As previously discussed, the J-STD-036 and J-STD-034 standards set the protocol and message format to acquire and deliver BS/cell/sector information and lat/long measurements to the PSAP 254 either with call setup (i.e., call-associated signaling (CAS)) or upon request by the PSAP 254 (i.e., non-call-associated signaling (NCAS)). The details of how the network measures the location of a MS are proprietary and not part of the LSU 184. The LSU 184 only needs receipt of the MS location data during the actual operation of the emergency location information delivery (ELID) hardware.

As previously discussed, the MSC 108 is the control center of the cellular system 100 in regards to routing calls both between MSs in the same cell or sector, between BSs in the wireless network, or to outside wireless networks, the PSTN 110, or dedicated lines with specialized hardware or servers. The J-STD-036 standard provides that the position information of an E-911 Phase 2 ELID network must transfer to the Emergency Services Network (ESN) (see FIG. 4) without restricting the proprietary technologies that might be chosen to meet the FCC mandate. FIGS. 4–7 summarize how J-STD-036 and J-STD-034 set the standards for both delivery of BS, cell, sector information (E-911 Phases 1 and 2) and lat/long parameters (E-911 Phase 2). As previously mentioned, the Phase 1 network does not require lat/long measurements or the associated network hardware to extract, refine, and deliver this data. Both standards set the protocol and message format to acquire and deliver this information to the PSAP 254 either with the call setup (i.e., CAS) or upon request by the PSAP 254 (i.e., NCAS). The details of how the network 100 measures the location of the MS is proprietary and not a part of the LSU 184 because the LSU 184 only requires receipt of the MS location data during the actual operation of the wireless network ELID hardware.

Figure 4:
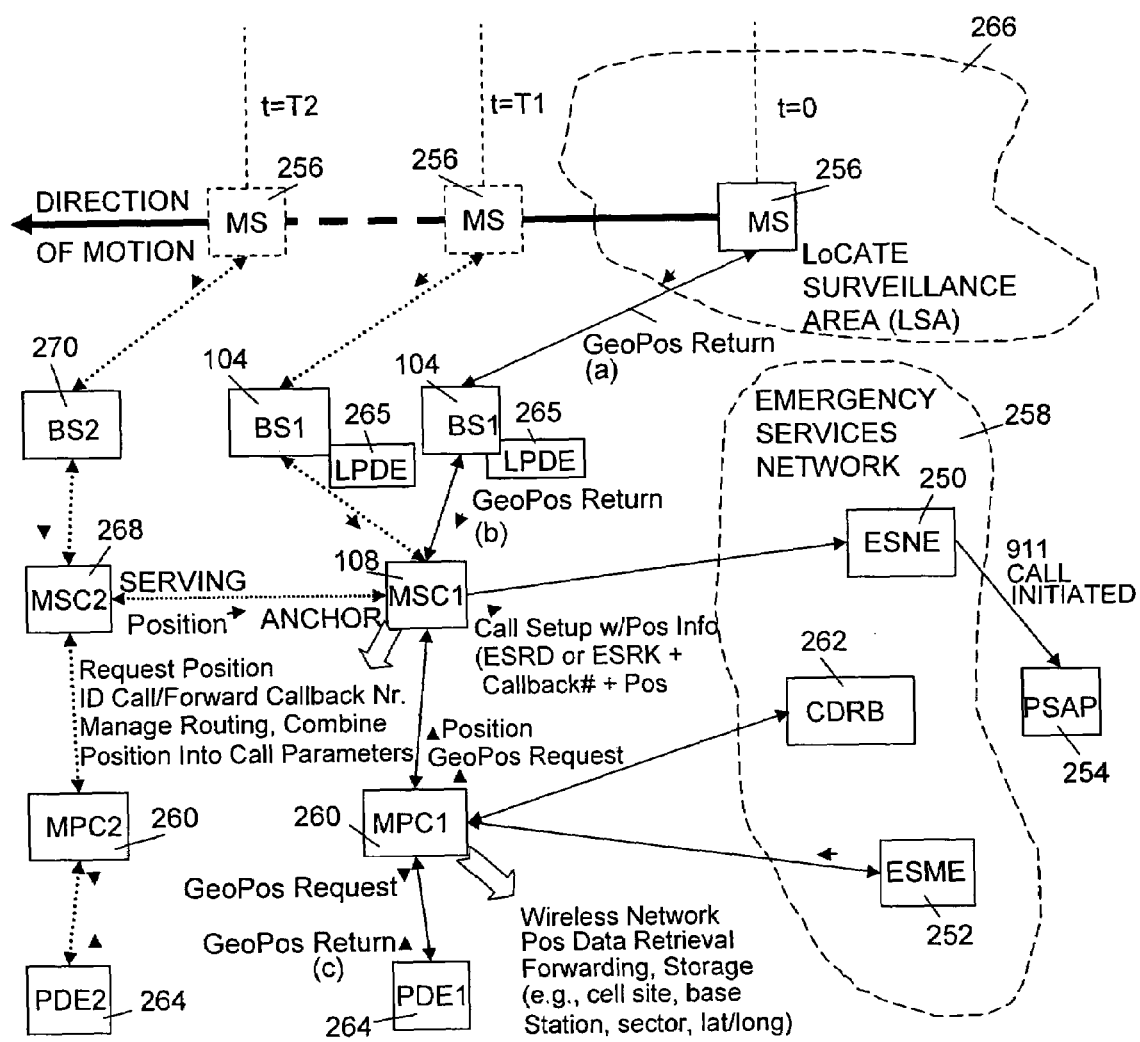
FIG. 4 is a schematic diagram illustrating an ANSI-41 Call Associated Signaling (CAS) Emergency Network.
Figure 5:
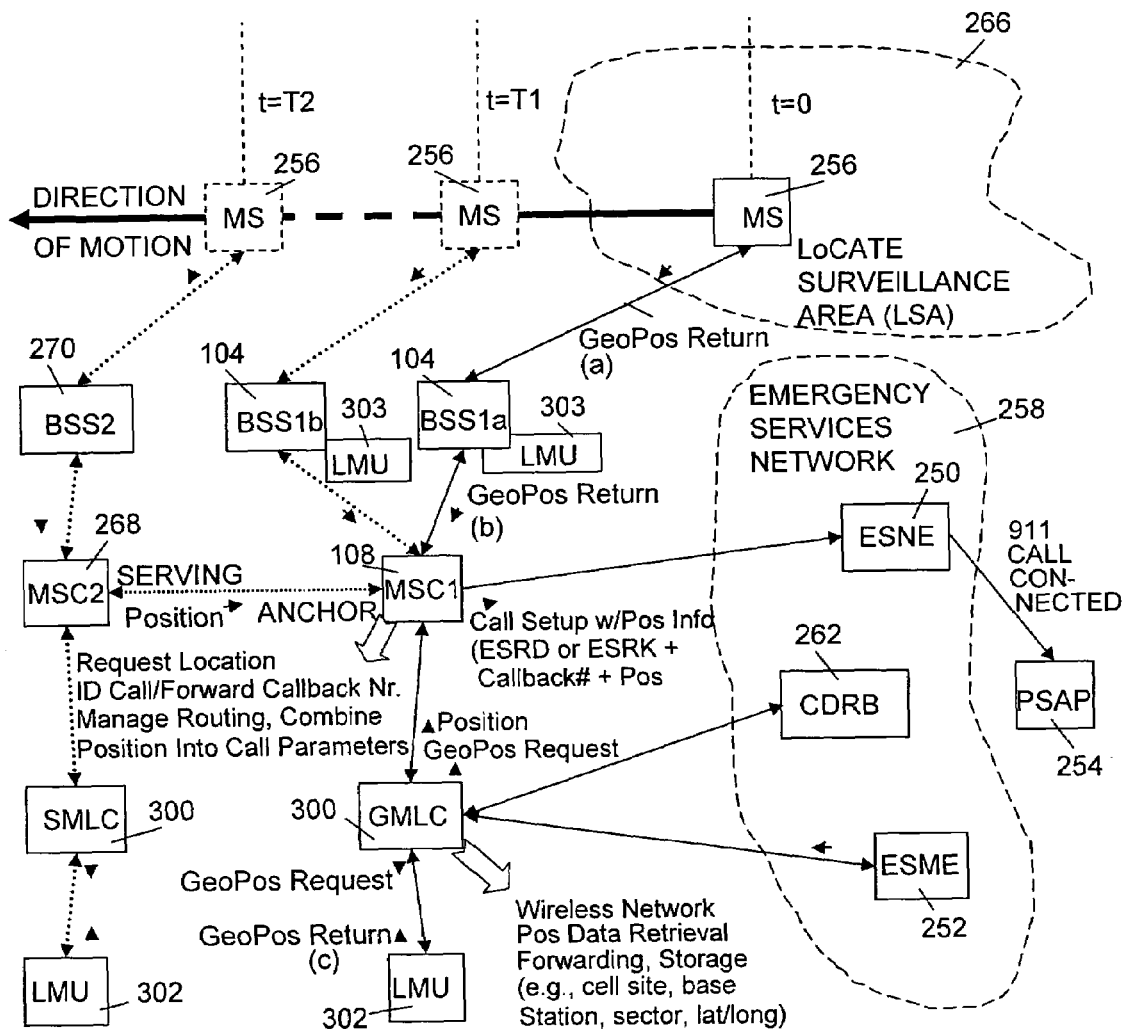
FIG. 5 is a schematic diagram illustrating a PCS 1900 CAS Emergency Network.
Figure 6:
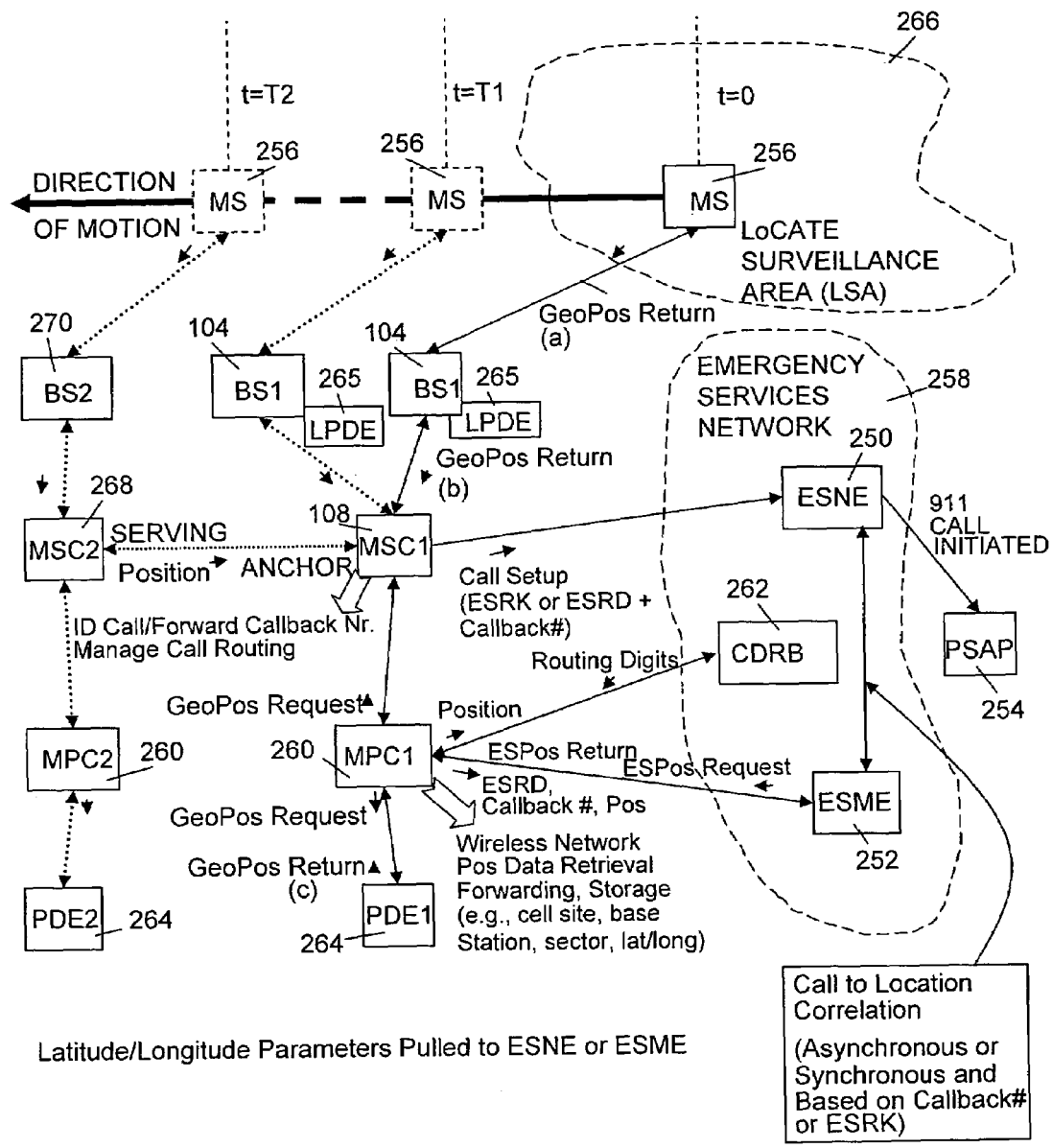
FIG. 6 is a schematic diagram illustrating an ANSI-41 Non-Call Associated Signaling (NCAS) Emergency Network.
Figure 7:
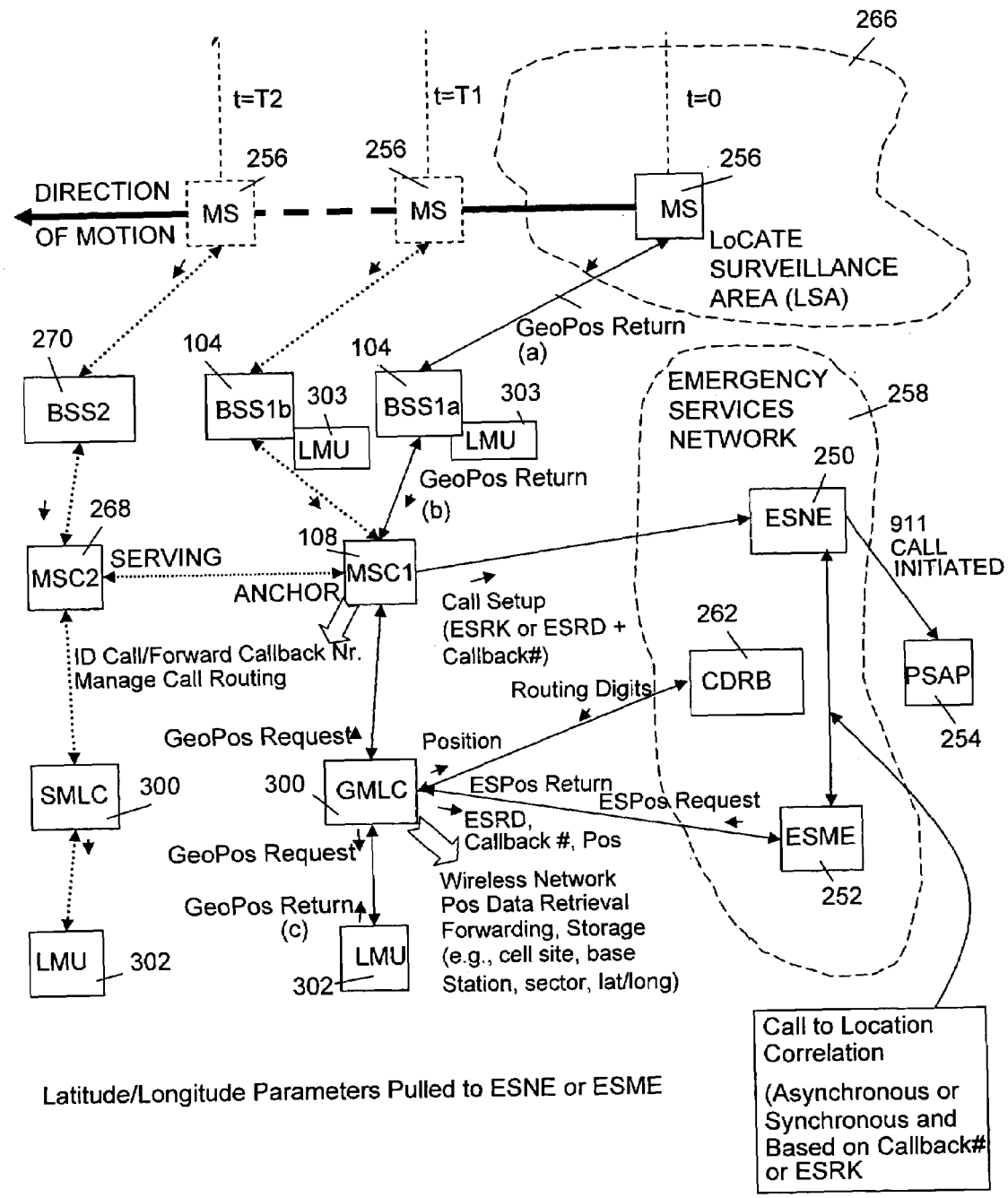
FIG. 7 is a schematic diagram illustrating a PCS 1900 NCAS Emergency Network.

FIGS. 4–7 show how the latitude and longitude (lat/long) of a MS 256 in a 911 call are delivered to the Emergency Services Network (ESN) 258, which in turn routes the call to the appropriate PSAP 254. There are two general methods for delivering the position of the MS 256 to the ESN 258: call associated signaling (CAS) and non-call associated signaling (NCAS). CAS involves the position data being included in the call setup to the Emergency Services Network Entity (ESNE) 250 and NCAS involves the Emergency Services Message Entity (ESME) 252 that requests and stores the position data for later use by the PSAP 254, which receives the voice band of the 911 call via the ESNE 250. The distinction typically made between CAS and NCAS emergency networks is that the CAS network "pushes" the location parameters of the MS 256 to the ESN 258 while the NCAS network "pulls" the location parameters of the MS 256 to the ESN 258. In practice, a hybrid of the two methods is possible where the voice portion of a 911 call is pushed to the PSAP 254 with CAS techniques and the PSAP 254 pulls the location data as required by using NCAS techniques. In the United States, the ANSI-41 and PCS 1900 networks operate in a similar fashion for CAS or NCAS position reporting, with some differences discussed below in the individual discussion of FIGS. 4 through 7. FIG. 4 illustrates an ANSI-41 CAS Emergency Network. FIG. 5 illustrates a PCS 1900 CAS Emergency Network. FIG. 6 illustrates an ANSI-41 NCAS Emergency Network. FIG. 7 illustrates a PCS 1900 NCAS Emergency Network.

One very important distinction between CAS and NCAS is that the CAS method requires that the MSC 108 (e.g., MSC1 in FIG. 4) receive and include the location data in the call setup to the ESNE 250, while the NCAS method can be much more complicated by either the network 258 being configured to send location data directly to the ESME 252 without passing the data through the MSC 108 (e.g., a special router utilizing TCP/IP protocol might connect directly to the ESME 252) or by the ESME 252 operating in an asynchronous manner where the data is simply stored for the eventual use of the PSAP 254 if deemed necessary.

To summarize, the addition of the LSU 184 to a CAS Emergency Network (FIGS. 4 and 5) is primarily implemented by the MSC 108 informing the LSU 184 of the location parameters of the MS 256 at the time of call setup. In the NCAS Emergency Network (FIGS. 6 and 7), either the MSC 108 or the LSU 184 must request data from the location data server (i.e., the mobile position center (MPC) 260 in the ANSI-41 network or the gateway mobile location center (GMLC) or serving mobile location center (SMLC) in the PCS 1900 network) at the time of 911 call initiation by the MS 256 to ensure that the LSU 184 is notified of the location of the MS 256 in time for an authorized third-party to participate in the call with the PSAP 254. The GMLC and SMLC are referred to generally as MLC 300 below.

The basic operational components of the ANSI-41 and PCS 1900 Emergency Networks are now described before discussing FIGS. 4–7 in greater detail. The lower encircled area on FIGS. 4 through 7 represents the local government Emergency Services Network (ESN) 258. This is a proprietary operational system that is configured to receive, store, and route 911 calls and the MS 256 positional data to the appropriate PSAP 254. The operational subsystems of the ESN 258 are the ESNE 250, the ESME 252, and the Coordinate Routing Database (CDRB) 262. The general operations of these subsystems are discussed below.

The ESNE 250 typically receives the voice band of the 911 call and routes it to the appropriate PSAP 254. In the case of the CAS emergency network (FIGS. 4 and 5), the ESNE 250 receives all location related data (explained later) on the MS 256 from the MSC 108 during the setup of the 911 call. In the NCAS network (FIGS. 6 and 7), the ESNE 250 receives the same types of information, except the location data are sent to the ESME 252 as described below.

The ESME 252 can have many purposes such as utilizing the location information of the MS 256 to plot its location on a geographic information system, broadcasting or receiving messages from emergency response teams or other PSAPs, or querying other databases or wireless network servers for call routing, location, or subscriber information. In the CAS emergency network, the ESME 252 is not considered essential to the operation of the LSU 184 because the LSU 184 can access the needed location information at the time of call setup to the ESNE 250. However, the ESME 252 plays a major part in the NCAS emergency network because the ESME 252 controls the request for location information by the ESN 258 and can either request location data at the time of the call setup by the MSC 108 or simply wait until the location is requested by the PSAP 254. The specific operation needed in the MSC 108 to assure proper operation with the LSU 184 in the NCAS network will be discussed below for FIGS. 6 and 7.

The CDRB 262 is a centralized coordinate routing database run by the local government emergency management agency (EMA) that could support multiple applications within the emergency network 258. The CDRB 262 would be primarily useful for an E-911 Phase 2 network, but could be applied to larger metropolitan areas with E-911 Phase 1 networks incorporating many micro-cells and pico-cells. The local area may be divided into specific safety zones with different authorized PSAPs and also accommodate specific user or wireless provider applications utilizing trusted location and attribute data peculiar to the total ESN 258 coverage area. In fact, the CDRB 262 could be structured to specifically support the LSU 184 by including an optional "trusted" database for both the ESN 258 and the LSU 184 with locations of businesses, institutions, and high profile surveillance areas along with authorized phone numbers for third-party connection to a 911 call.

It should be understood that the CDRB 262 or the ESME 252 could be structured to supply some of the database elements to the LSU 184, but in the embodiments of the present invention described herein, the necessary data are built into the LSU 184. A decision to place certain LSU operations in the CDRB 262 or the ESME 252 might be made based upon the individual cellular provider and local emergency network existing hardware/software infrastructure and the best business solution available to achieve the operational benefits of the LSU 184 as described herein. In the E-911 Phase 1 network, the location data in the LSU 184 are included in a database of metropolitan zones including BS, cell, and sector areas. In the E-911 Phase 2 network, the location information in the LSU 184 are primarily measured lat/long data describing the perimeter of individual properties that are designated for 911 call surveillance. This lat/long data are taken from either actual on-site GPS measurements or existing Geographic Information Systems (GIS) maps.

Another topic related to FIGS. 4–7 is what constitutes raw location data and refined location data in an emergency network and where the sources of these two types of data are located. First, raw location data are measurement data that do not completely describe the geodetic coordinates of the MS 256 in the most accurate manner. In the E-911 Phase 1 network, the raw data are the BS, cell, or sector and there is no mandate for the wireless provider to refine the location. In the Phase 2 network, the raw location data include complex ranging/timing data taken from the MS 256, multiple BSs, or satellite (depending on the proprietary technologies chosen) along with the BS 104, cell, and sector data of the MS 256 in a 911 call.

All of the data are passed between the various entities in the network utilizing a protocol to correlate operations and data associated with the call. The data are shown in FIGS. 4–7 as GEOPOS (geographical position) data. Due to the complex accuracy issues with GPS satellite triangulation, individual tower triangulation, elapsed time measurements (by the wireless handset or by the base station, depending on the measurement technique), etc., the E-911 Phase 2 ALI accuracy requirements typically require a mathematical calculation of measurements in a processor either located in the BS 104, the MSC 108, or at a centralized point accessible to the network. This refined measurement is referred to in FIGS. 4–7 as simply POSITION, which includes lat/long along with BS, cell, and sector location identifier digits included in the ESRD and ESRK. The MSC 108 must provide the LSU 184 with the POSITION prior to the MSC 108 routing the 911 call to the PSAP 254 so that the LSU 184 can provide the MSC 108 with the specific authorized third-party phone number in time for the MSC 108 to setup a 3-way phone call between the PSAP 254, the MS 256, and the onsite authorized phone. The actual process utilizing the ESRD and ESRK is described below.

The way in which the wireless network produces and stores the POSITION of the MS 256 engaged in a 911 call is now described. In the E-911 Phase 1 network, the MSC 108 provides the BS, cell, and sector to a service control point SCP (not shown) that assigns an ESRD (CAS network) or an ESRK (NCAS network) to a specialized router (not shown) that passes the MS 256 POSITION along with the voice channel to the PSAP 254 as either part of the call setup (CAS) or for storage in the ESME 252. In the Phase 2 system, there may be multiple specialized position computers in the wireless network that typically work to make either raw or refined position measurements of the MS 256. These computers are referred to as a Positional Determination Entity (PDE) 264 in the ANSI-41 network (FIGS. 4 and 6) or as a Location Measurement Unit (LMU) 302 in the POS 1900 network (FIGS. 5 and 7). The position computer can be either a centralized computer in the network or a single computer located with the BS 104 (i.e., the Local Positional Determination Entity (LPDE) 265 or LMU 303) or both.

A second computer, called the Mobile Position Center (MPC) 260 or the Mobile Location Center (MLC) 300 in the ANSI-41 network and the PCS 1900 network, respectively, is responsible within the network to either request and/or receive the refined position measurements for the MS 256. The MPC 260 or MLC 300 selects the appropriate PDE 264 or LMU 302, respectively, and caches the POSITION of the MS 256 until the MSC 108 signals the end of a 911 call or until the ESME 252 provides further instructions. The programming of the MPC 260 or MLC 300 can be different, depending on the specific preferences or needs of the ESN 258. However, the LSU 184 only needs the lat/long measurements of the MS 256 at the time the 911 call is initiated (the assumption here being that a problem has occurred nearby instead of later when the MS 256 has traveled a significant distance from Where the 911 call was initiated). In the CAS network, the MPC 260 or the MLC 300 operation is straightforward because the MPC 260 or the MLC 300 must provide the MSC 108 with lat/long of the MS 256 at the time of call setup, but the NCAS network only needs a position measurement at the time that the ESME 252 either automatically requests the measurement or the PSAP 254 decides to ask for the position of the MS 256.

A fixed or random time delay associated with the measurement of position allows the MS 256 to move to a new position. Therefore, the LSU 184 in the NCAS system must be tailored operationally to request the MPC 260 or the MLC 300 to provide the initial lat/long of the MS 256 at the time of 911 call initiation. The following paragraph explains how the Phase 2 wireless network and the MPC 260 or the MLC 300 must deal with a moving MS 256.

It should be understood at this time that the Phase 1 system does not require a MPC 260 or a MLC 300, but rather that the SCP simply reads the BS, cell, and sector from the MSC 108 and assigns the appropriate ESRD or ESRK that allows for the data to be passed through the ESN 258 to the PSAP 254. The difference between the ESRD and ESRK is that the ESRD is a digit string that uniquely identifies the BS, cell, or sector in a CAS Emergency Network. The ESRD is provided to the MSC 108 by the SCP and the MSC 108 sends the ESRD along with the MS 256 voice channel and the callback number for routing by the ESN 258 to the PSAP 254. The ESRK is a 10-digit routable number translated from the BS, cell, and sector information provided to the SCP. The ESRK is used by the ESN 258 to route the 911 call to the appropriate PSAP 254 and is also used as a search key for correlating data from different paths (e.g., voice from ESNE 250 and lat/long from ESME 252) to the PSAP 254. The LSU 184 references the ESRK or ESRD to ensure correlation with the correct 911 call information as the LSU 184 operates in parallel with the wireless network and the ESN 258.

FIGS. 4–7 illustrate the MS 256 starting to move at time t0 and being in motion at times t1 and t2. The surveillance zone is shown to illustrate the perimeter of a property that is programmed in the Locate Surveillance Area Map (LSAM) stored in the LSU 184 that interfaces with the MSC 108. The discussion below deals with three scenarios: (1) the MS 256 initiates a 911 call at each time shown, (2) the MS 256 initiates a 911 call at t0 and the call is still in progress at t1 and t2, and (3) the MS 256 initiates a regular call at t0 and decides at either t1 or t2 to place the regular call on hold and make a 911 call.

In Scenario 1, the E-911 Phase 2 network initiates action to measure the lat/long of the MS 256 at each of the times and the initial measurement (IM) occurs in accordance with the call setup delay (CAS) or requested time (NCAS). As the MS 256 is moving along, the control channel in the MS 256 ensures that the MS 256 remains accessible to a network base station and associated MSC 108, so that once a 911 call is initiated by the MS 256, the appropriate BS 104, MPC 260 or MLC 300, PDE 264 or LMU 302, and the MSC 108 support the IM. In this case, the addition of the enclosed surveillance area 266 at the top of FIGS. 4–7 requires that the full geodetic coverage map of this area be programmed into the LSU 184 relational database (i.e., the locate database 166) along with the prioritized list of authorized on-site security or law enforcement phones (referred to as third-party phones).

If the MS 256 initiates a 911 call at t0, the LSU 184 reacts to the receipt of lat/long data. However, a 911 call at t1 or t2 would be ignored by the LSU 184 (but would still be handled by the ESN 258) because the MS 256 is outside the LSAM. In the CAS network, the MSC 108 would require a slight modification of operational software to simply deliver the lat/long to the LSU 184 at the time of call setup with the ESNE 250. In the NCAS network, either the MSC 108 or the LSU 184 must specifically request a lat/long on the MS 256 at the exact time of 911 call initiation to assure that the on-site security or law enforcement is activated at the time and place where the problem first occurs. Without this design feature in the NCAS network to accommodate the LSU 184, the request for an IM or a UM (updated measurement) at t1 or later would negate the benefit of on-site response to a 911 call.

The LSU 184 then searches its database for the appropriate LoCATE Surveillance Area Map (LSAM) and the authorized on-site phone, caches the time of 911 call initiation and LSAM identifier, requests the MSC 108 to connect an authorized third-party phone to the 911 call, and caches the time that the MSC 108 indicates the call being completed. This cache information would then be erased on a routine basis (e.g., once daily). This cache information would be available to an outside unit referred to as the Mobile LoCATE Unit (MLU) 218 (see FIG. 14). The MLU 218 includes either an integrated commercial off-the-shelf (COTS) wireless phone/computer that follows the data delivery protocol of the wireless provider network or a COTS computer in the PSTN 110 that follows TCP/IP protocol.

The MLU 218 contains the complete list of LSAMs as in the LSU 184 relational database along with an underlay GIS map of the metropolitan area to show the approximate physical location of each LSAM. The MLU 218 user could visually review the area coverage of a particular LSAM overlay with the appropriate COTS software (e.g., simple CAD or map program) showing the metropolitan area and then request the LSU 184 to either connect the MLU 218 phone to a 911 voice call or to supply the actual text listing of call initiation times, completion times, and callback numbers. An advantage of the MLU 218 is that once the LSU 184 is previously programmed with a large list of LSAMs, the MLU 218 can specifically monitor for 911 calls from as many LSAMs as required to perform surveillance for terrorist actions, crimes, and special events.

Figure 14:
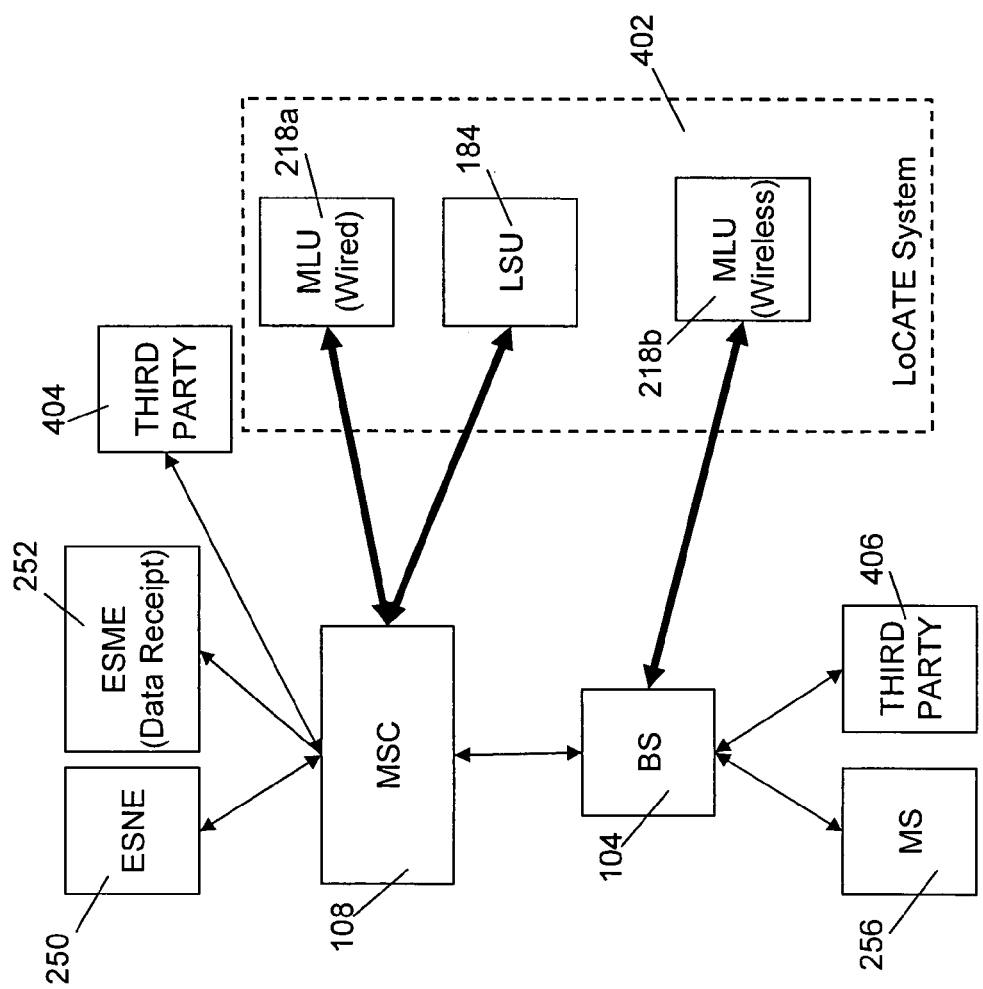
FIG. 14 is a block diagram illustrating the interfacing of the present invention to the Federal Communications Commission (FCC) E-911 Phase 1 cellular network.

In a slightly different operational role, the MLU 218 could be programmed to easily display the contents of the LSU 184 cache as a time-stamped text listing of 911 call progress by asking the LSU 184 to provide this information via TCP/IP protocol. This would be useful as a portable real-time display of all active 911 calls throughout the metropolitan area or selected surveillance areas and could be utilized by law enforcement teams in real-time situations to respond almost instantly to potential problems. FIG. 14 illustrates the operational interfaces of the MLU 218, the MSC 108, and the LSU 184 as described above. The third-party phone must be connected very quickly so that the MS 256 does not move out of the LSAM and incorrectly connect the wrong third-party to the conversation between the MS 256 and the PSAP 254. This operation is referred to as $t_{LSU}$ and is discussed in detail later.

In Scenario 2, the appropriate BS 104, MPC 260 or MLC 300, PDE 264 or LMU 302, and the MSC 108 are activated at t0. In the E-911 Phase 2 CAS network, the IM occurs shortly after t0, dependent mainly on the inherent delay time of all network hardware to respond to the request of the MS 256. In the NCAS network, the IM of the MS 256 is recorded shortly after t0 in accordance with the design parameters of the ESN 258. The ESME 252 may ask for the IM at the earliest point in time so that the measurement is available when the ESNE 250 routes the 911 voice call to the PSAP 254, or the ESME 252 may simply wait until instructed by the PSAP 254 to request the IM.

Because the MS 256 is moving, the 911 call in progress may be handed off to new BSs 270 networked to the original MSC 108, referred to as the anchor MSC or visited MSC (VMSC). It is possible that the MS 256 may move into another cellular zone or network area with a different MSC, referred to as the serving MSC (SMSC) 268. In the CAS network, the IM would occur shortly after t0. However, in the NCAS network, the ESME 252 may request an IM at any time or an updated measurement (UM) at any point during the 911 call. At time t1, the particular MPC 260 or MLC 300 and PDE 264 or LMU 302 of the anchor MSC or VMSC 108 will provide the IM or UM. At time t2, the IM or UM may occur under the control of the serving MSC or SMSC 268, but the IM or UM data are sent back to the anchor MSC or VMSC 108 for forwarding to the ESME 252 as requested. The original or anchor MSC 108 that assumed responsibility initially for routing the MS 256 call in the network retains the responsibility to route the IM or UM to the ESME 252, but the serving MSC 268 may be required to make the IM or UM measurement.

A delay in making the IM or UM means that the MS 256 has moved from the location where the 911 call was initiated. This is a problem for ensuring that the LSU 184 selects the nearby authorized third-party phone, particularly on-site security, at the location of the observed problem or threat, because a fast moving MS 256 could be a large distance away from the problem area at the time the ESME 252 requests the IM or UM of the MS 256. To assure the proper operation of the LSU 184 in notifying on-site security within prescribed boundaries, it is essential that the cellular network obtain and cache the IM or UM as quickly as possible after the 911 call initiation, regardless of when the ESME 252 requests a position measurement. In reality, a short delay in the ESME 252 requesting the IM or UM probably will not matter for LoCATE surveillance areas 266 that typically include only pedestrian areas and not transportation corridors or other ways in which the MS 256 could quickly pass through the area.

A more detailed discussion of the effect of network delivery of lat/long is presented below with reference to FIG. 14, which introduces the terms Position Timer (POST) and the LSU timed operation ($t_{LSU}$). These time intervals are not very critical in an E-911 Phase 1 network due to the large surveillance areas. However, the time intervals are extremely important in the Phase 2 network because very small surveillance areas are involved. In Scenario 2, the LSU 184 performs the same operations as in Scenario 1, with the addition that the MPC 260 or MLC 300 would have to request and cache the IM of the MS 256 whenever a 911 call is initiated in a NCAS network.

Scenario 3 is similar to Scenario 2, except that a normal (not emergency) phone call is in progress and at either t1 or t2, the original call is placed on hold and a 911 call is made. This call proceeds in a similar manner to that in Scenario 2, wherein the anchor MSC 108 retains control of reporting the location of the MS 256 to the ESN 258. If the 911 call is initiated at time t1, the anchor MSC 108 still utilizes its network elements to get the IM of the MS 256 and reports the results to the ESN 258. If the 911 call is initiated or a UM is requested at time t2, then the serving MSC 268 will utilize its network elements to make the position measurement and send this information to the anchor MSC 108, which in turn sends the results to the ESN 258 as described in Scenario 2 above.

In Scenario 3, the LSU 184 operates the same as for Scenario 2, except that the LSU 184 receives information on the lat/long of the MS 256 and, provided that the MS 256 location is inside a LSAM, all the appropriate information is cached as stated in Scenario 1. However, the three-way voice connection between an on-site phone, the MS 256, and the PSAP 254 might not be possible due to limitations by the wireless provider on the number of phones that can be connected to a single MS at one time. The LSU 184 cache data on the MS activation inside a particular LSAM could still be retrieved by the MLU 218 and displayed on a computer screen to indicate a 911 call in progress.

As discussed above, in the E-911 Phase 2 wireless network, the MSC 108 or in certain cases the MPC 260 or MLC 300 if the NCAS network is designed to bypass the MSC 108 with positional data directly from the MPC 260 or MLC 300 to the ESME 252, provides the appropriate information so that the LSU 184 can independently (1) locate the authorized third-party phone to participate in the 911 phone call, or (2) display via the MLU 218 (described below) the cache of 911 calls coming from the surveillance area 266. The physical connection to the LSU 184 from the MSC 108 is shown in FIG. 3 as an operational interface with further details provided below in a discussion of FIGS. 14 and 15.

It should be expected that the proprietary network details and individual facility features will allow for these functions to be done in multiple hardware/software configurations. As previously mentioned, J-STD-036 was generated to deal with all elements of an ELID network, regardless of configurations, through specification of which elements must work together and the general types of data that must be available across the interfaces. According to the present invention, the LSU 184 communicates with the MSC 108 and the MPC 260 or MLC 300, and the interfaces between these network entities always refer either to the same callback number, the same ESRK (Emergency Services Routing Key), or the same ESRD (Emergency Services Routing Digits) when position parameters (i.e., base station, antenna sector, or lat/long) are referenced.

The LSU 184 is essentially a processor with all the information about each LoCATE surveillance area 266 stored in a commercial off-the-shelf (COTS) relational database on a hard drive. In the E-911 Phase 1 system, the LSU 184 relational database includes every base station or any lower-level position identifier, such as antenna sector, and the LoCATE authorized phones (LAPs), which typically include nearby police (but on-site security could be included where micro-cells or pico-cells are used) that will participate in a phone call between the MS 256 and PSAP 254. For the E-911 Phase 2 system, a LoCATE surveillance area map (LSAM) is created for a LoCATE subscriber property and is encoded in the LSU 184 to correlate to the exact latitude/longitude determined by any available mapping tool from existing paper maps, to computer mapping software, and to actual waypoint measurements taken from handheld GPS receivers.

Figure 8:
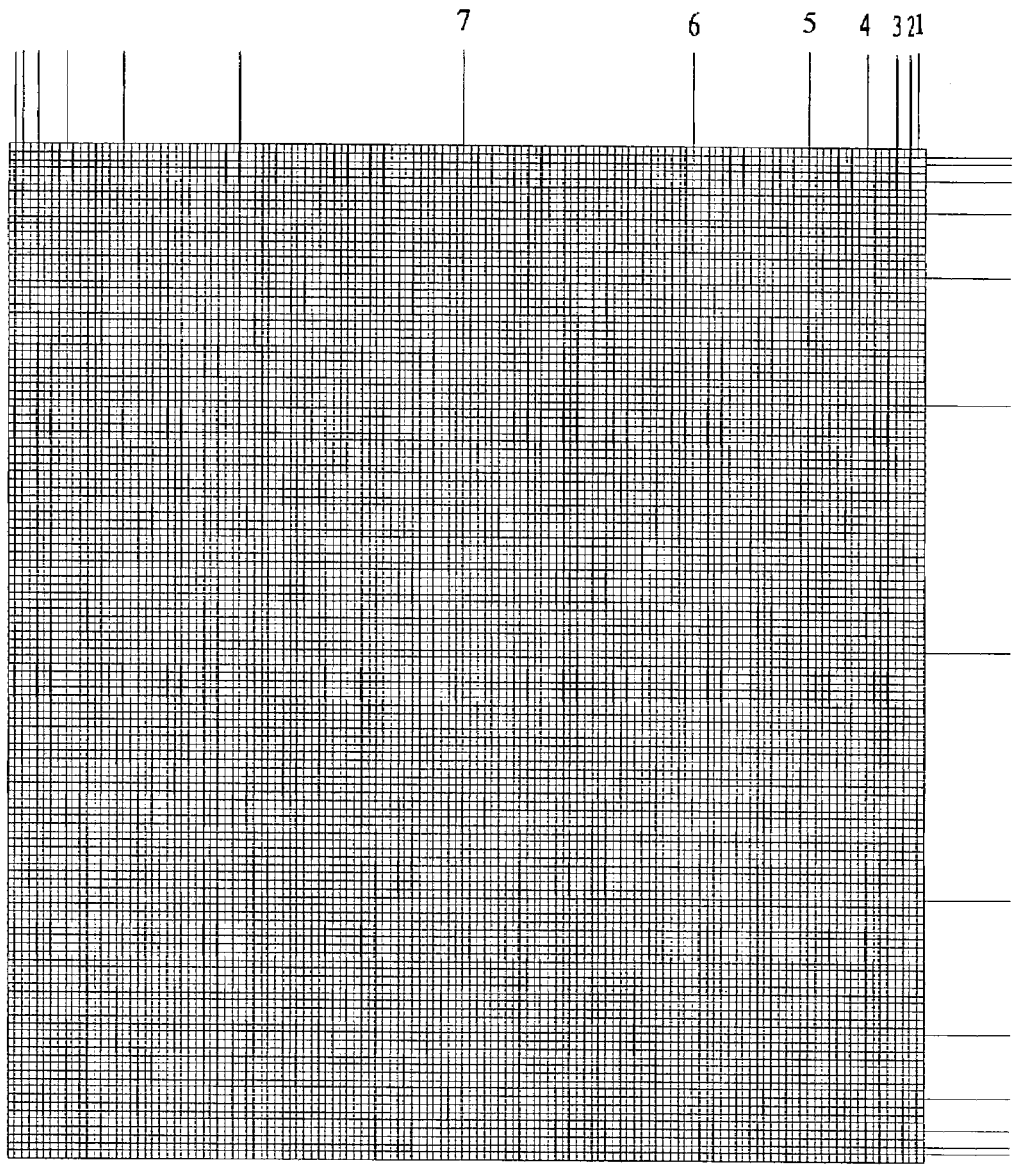
FIG. 8 is 128×128 pixel geodetic grid of 0.64° latitude by 0.64° longitude depicting surveillance areas of major metropolitan areas.
Figure 9:
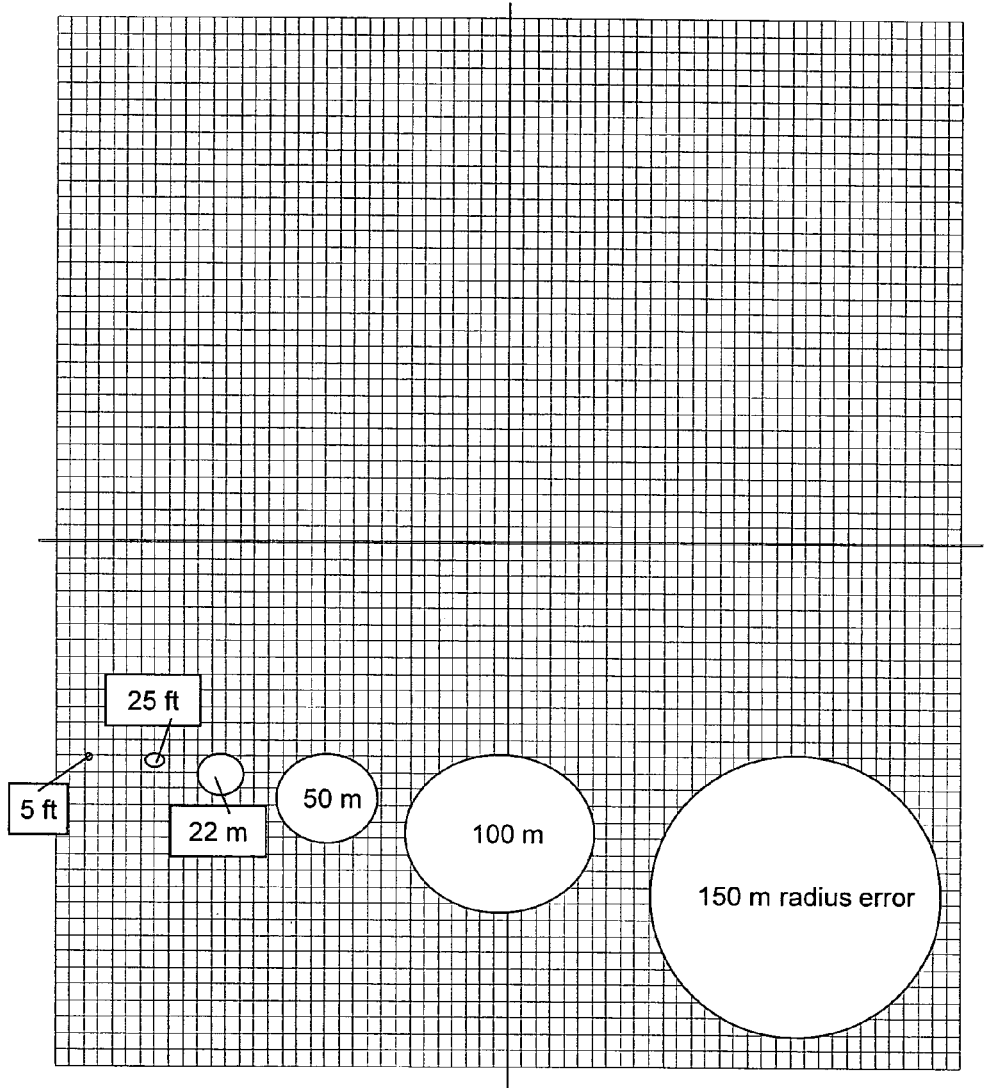
FIG. 9 is 64×64 pixel geodetic grid of 0.01° latitude by 0.01° longitude illustrating circular radius errors of positional accuracies in locating a mobile system within a surveillance area.

FIG. 8 illustrates a 128×128 pixel geodetic grid of 0.64° Lat by 0.64° Long that could be applied to map a major metropolitan area. However, as the examples at the bottom of FIG. 8 indicate, this grid is inadequate to show anything smaller than the largest business property. FIG. 9 illustrates a 64×64 pixel geodetic grid of 0.01° Lat by 0.01° Long with illustrated circular radius errors (approximate, varies with geo-location) of the FCC mandated positional accuracies for E-911 Phase 2, as well as the expected a-GPS accuracies and GPS receiver accuracies. The map of FIG. 9 provides the appropriate level to closely look at the location of a MS in a 911 call, and is chosen as the optimum level to identify actual property boundary lines in a raster database for the LSU 184.

Figure 10:
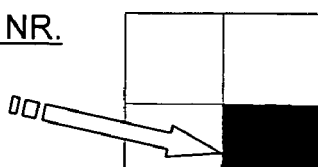
FIG. 10 is a diagram illustrating a hierarchy of mapping levels according to the present invention.
Figure 10:
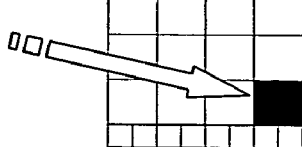
Figure 10:
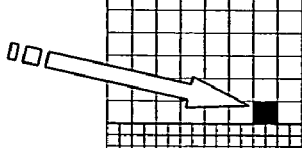
Figure 10:
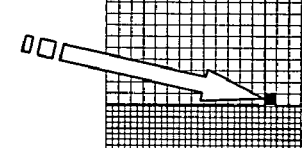
Figure 10:
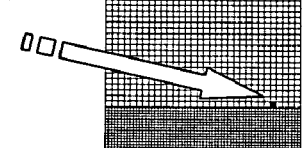
Figure 10:
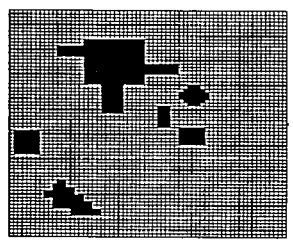
Figure 13:
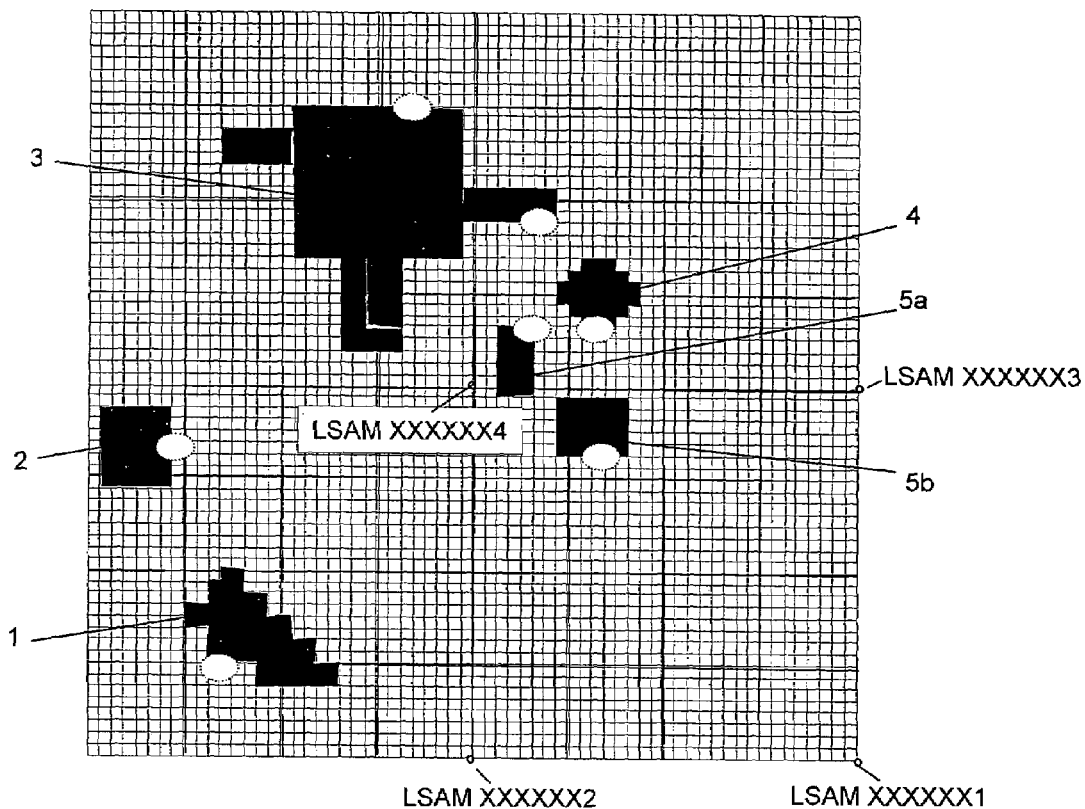
FIG. 13 is a diagram illustrating the encoding of property on a map according to the present invention.

FIG. 10 illustrates a hierarchy of LSAM levels that starts with a 0.64° Lat×0.64° Long map and applies quadtree encoding (i.e., repeatedly quartering maps to arrive at a 0.01° Lat×0.01° Long map (a LSAM level 6 map as shown in FIG. 10) that becomes the level at which actual property lines are drawn on a raster and the enclosed area is identified by encoded company identifiers, LAPs, and other data (see FIG. 13). Both geodetic LSAMs (square areas with exact dimensions for latitude and longitude) and property LSAMs (combinations of geodetic LSAMs with specific area pixels included from each LSAM) are provided. The LSU 184 finds the lowest resolution LSAM that includes the lat/long of the MS 256 and reads the corresponding data for the pixel that contains the MS 256 location.

In many cases in which smaller businesses or organizations are involved, the LSAM will contain multiple properties, particularly in downtown areas. To avoid a lengthy search of every pixel in the LSAM Level 6 map, smaller maps (see FIG. 13) are used so that only those areas with LoCATE subscribers are detailed in the locate database 166. All other areas of the LSAM Level 6 map are bypassed until encoded properties are shown in these areas.

Although the LSAMs are unique to the LSU 184, the authorized phone list in the LSAM database should contain numbers trusted by the local government emergency response agency, and the wireless LAP is authenticated within the MSC 108 as both an authorized subscriber and authenticated phone at the time of use in the cellular network. This process is in contrast to the authorization of the 911 caller, which is waived by the FCC. Trusted numbers are provided to the LSU 184 for both fixed and wireless LAPs by providing periodic programming updates to the LSU 184 or periodic updates supplied electronically by the CDRB 262 or ESME 252. Verification by the LSU 184 of LAP authorization occurs at the time of a 911 call to prevent incorrect or illegal inclusion of a third-party to the call in progress between the MS 256 and the PSAP 254. Additionally, the MSC 108 authenticates both the phone number and actual handset serial number for wireless LAPs through its normal operating security procedures related to the home database 160, the visitor database 162, and the internal identification chip.

FIG. 10 illustrates construction of a specific LSAM. Grid 1, referred to as LSAM Level 1, represents an area described by 0.64° latitude×0.64° longitude, which is referenced to a small coordinate point in the lower right corner of the grid (shown at the top of FIGS. 11 and 12). The lat/long measurements are based on the WGS-84 geodetic datum, which describes a particular ellipsoidal earth model that is also used by the Global Positioning System (GPS). In this particular model, the projected coordinates of points are measured as latitude, longitude, and height, which take into account the surface topography at a point. The actual projected distances along the earth's surface (at various heights) are complex calculations for the WGS-84 ellipsoid. However, the length of a degree of latitude varies only slightly from the equator to the poles (68.71 to 69.40 miles, respectively). The length of a degree of longitude is a complex function of the latitude and varies significantly from the equator to the poles (69.17 to 0 miles, respectively). For the continental United States, the length of a degree of latitude varies approximately 0.20 miles and the length of a degree of longitude varies approximately 12 miles. What this means for the projection of a geodetic map to actual distance along the earth's surface is that projected surface distances must be calculated for the exact earth location. However, this is not a calculation problem to the LSU 184 because the LSU 184 operates with lat/long degree measurements made by COTS GPS/a-GPS hardware or wireless network hardware.

LSAM Level 1 (containing four LSAM quads) is referred to herein as the LSAM Small-Scale (SS), which is the highest level map that includes the total coverage area (described by lat/long parameters) for the relational database in the LSU 184. Each successive LSAM level is constructed by dividing each LSAM quad into quads. The cross-hatched area represents an example of how a single LSAM quad at each level completely contains the particular LSAM of interest. As shown in FIG. 10, each LSAM quad is shown as a square when in fact the ratio of latitude to longitude projected distances (i.e., raster shape factor) is not square. However, this is usually unimportant until LSAM Level 6, where the typical perimeter map of a large business property is displayed and interpolation is a consideration as to whether an actual real property boundary fills an entire pixel.

LSAM Level 6 is also referred to as the LSAM Large-Scale (LS), which typically represents the smallest LSAM quad (approximately 0.4 square miles) that allows for the entire property of a large business to be displayed. The LSAM LS quad is constructed of a 64×64 pixel grid that is further divided into LSAM Levels 7, 8, and 9 maps, which include approximate areas of 0.1, 0.025, and 0.00625 square miles, respectively. The smallest pixel in a LSAM LS is equivalent to 0.0001560° Lat×0.000156° Long, which projects to approximately an area of 2,500 to 3,000 ft$^2$ (over the continental United States), and this minimum area is the resolution of the LSU 184.

Figure 11:
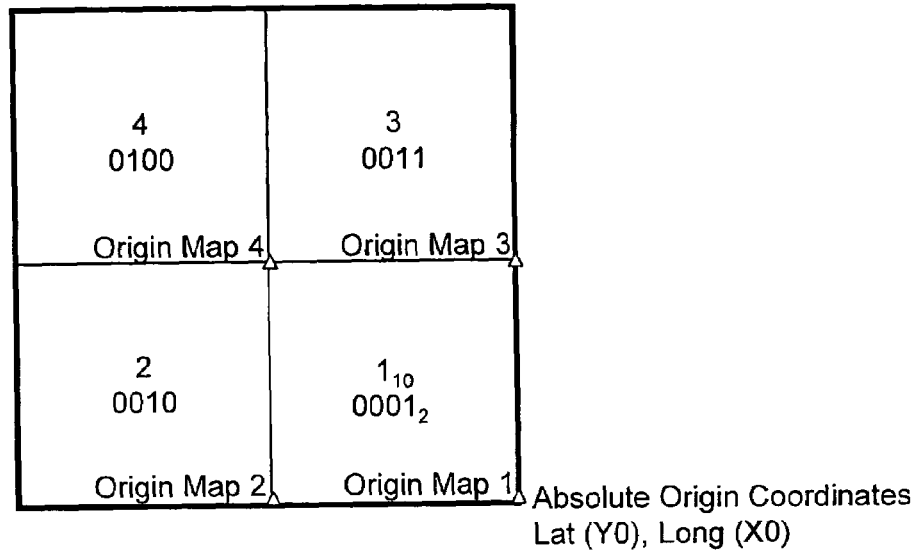
FIG. 11 is a diagram illustrating a scheme for determining map numbering according to the present invention.

FIG. 11 illustrates encoding (i.e., naming) LSAMs from Grid 1 (Quad=0.32000 Lat×0.3200° Long) in successive quartering of area down to Grid 9 (Quad=0.001250 Lat× 0.00125° Long). Each LSAM is specifically encoded in computer memory with a unique binary number that can easily be referenced by the LSU 184 or MLU 218 to conduct and correlate all internal operations, MS caller data (e.g., callback numbers, time of call initiation, time of call completion, etc.), LAP phone numbers, LAP authentication, and MLU 218 retrieval of a text listing of time-stamped 911 calls from the area.

The LSU 184 accesses the memory address of the encoded LSAM and in turn jumps to other memory addresses that contain (1) the quantitative number of LoCATE surveillance properties in the LSAM, (2) the authorized LAP phone numbers for each property (on-site security or police) or the authorized LSP for the entire LSAM (special police or homeland security surveillance areas), and (3) the trusted dates of authentication of LAP or LSP phone numbers to participate in 3-way calls with 911 callers and the PSAP 254. The particular LSAM of interest is also identified by the MLU 218 to the LSU 184 so that the LSU 184 (1) provides the MLU 218 phone number to the MSC 108 for a 3-way call between the MLU 218, the MS 256, and the PSAP 254, or (2) provides the MLU 218 with a time-stamped text listing of the 911 calls from the particular LSAM.

Figure 12:
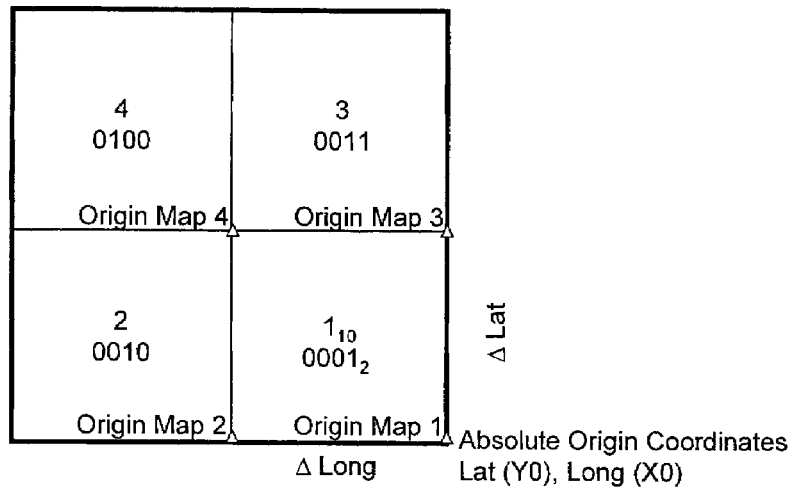
FIG. 12 is a diagram illustrating calculation of map origin latitude/longitude ($LAT_{ref}/LONG_{ref}$) according to the present invention.

As illustrated in FIG. 11, the technique utilized to encode a LSAM is to number each quad from 1 to 4 in the z-shaped pattern shown at the top (i.e., lower-right quad to lower-left quad, to upper-right quad, to upper-left quad) and to identify each quad by its number while successively adding an additional digit for each successive quad in the quad-tree hierarchy. FIG. 12 illustrates the technique utilized to determine the origin latitude/longitude coordinates of each LSAM map stored in the locate database 166. In simple terms, the incremental increases in latitude and longitude for each LSAM level are added, depending on the LSAM level and quad position of a particular LSAM. The combination of exact numbering for any LSAM in the quad-tree hierarchy and the precise identification of each LSAM's map origin coordinates makes it fairly straightforward for the LSU 184 to read the MS 256 lat/long parameters supplied via the MSC 108 (or in some situations directly from the MPC 260 or MLC 300) and immediately identify which LSAM to scan for the location of the MS 256 and the authorized third-party to participate in the phone call to the PSAP 254. The ability to both identify the exact LSAM number and map origin coordinates is advantageous to the MLU 218 usage because this allows the user to simply apply a CAD overlay of LSAMs to any COTS mapping software display and visually pick those areas where surveillance is desired, and immediately send the LSAM identifier numbers to the LSU 184 via the MSC 108 for retrieval of data.

As previously stated, LSAM Level 6 typically is larger than a single large business property. In crowded business districts containing many small property dimensions (e.g., skyscrapers with small footprints), the positional error of the E-911 ALI technologies may result in an uncertainty as to which building contains the 911 caller, which creates a problem with the correct on-site security being alerted. This is illustrated in FIG. 13 with properties 4 and 5a, which shows the small white oval shapes as the radius of uncertainty regarding the exact position of the 911 caller.

There are several partial solutions to this problem, which is dependent on the particular cellular provider's ALI accuracy (i.e., certain technologies are expected to be considerably better than the FCC mandate). The white ovals represent the expected average performance of a-GPS. The first solution is to artificially reduce the business property lines on the LSAM Level 6 map to reduce the probability of the caller being outside the property lines of the business (although it might be desirable to include any city streets or water adjacent to the property and allow the property lines to be exceeded). The second solution is for adjacent building on-site security to have a workable operational communication system to alert each other if the 911 call warrants an immediate response without regard to the exact property lines. The third solution is to simply include lower LSAM levels (e.g., LSAM Level 8, 9, etc.) that allow each on-site security force to utilize the MLU 218 to receive the same 911 caller information simultaneously and possibly alternate (on a daily basis) as to which security force serves as the third-party in the 911 call.

Another real advantage of the lower LSAM levels is that law enforcement could set up an effective surveillance area for multiple buildings without regard to the property boundaries of each business. FIG. 13 illustrates the LSAM Levels 7, 8, and 9 applied to a LSAM Level 6 map, which results in geographic surveillance areas (as small as approx. 400 ft. by 400 ft.) that are then divided into 64 pixels of approximately 2,500 ft$^2$. The individual pixels are coded in memory addresses as to business name and authorized third-party numbers, last dates of authentication of third party numbers, and optional priority codes for an authorized MLU 218 to receive a log of 911 calls coming from the area. The LSAM for a business property differs from the geodetic LSAMs in that rather than being a square of known origin and side dimensions, the business property LSAM is a collection of bitmaps from a group of geodetic LSAMs. As FIG. 13 illustrates, a geodetic LSAM is shown by an encoded number, while a property LSAM will either reference the name of the property or a number before the word "LSAM" in parentheses.

As previously mentioned, at Grid 6 level, the geodetic LSAM is broken into four quads with a 32×32 grid each. An overlay of a perimeter map (taken from actual GPS waypoint measurements by security personnel or law enforcement or an existing GIS map that is recognized by the local government or PSAP 254) is drawn under this grid. GPS waypoints are connected by straight lines or whatever technique is available for better accuracy and decisions are made to either include pixels into an LSAM, depending on whether or not more than 50% of the pixel (or other criteria chosen by the on-site security) is common to the LSAM.

As FIG. 13 shows the actual map of a property LSAM converted to a bit raster, which is encoded as to the geodetic LSAMs that contain the property and linked to the exact 64-bit map that shows which pixels are associated with the property. Because the origin coordinates of each geodetic LSAM are known, it is a straighforward matter to recognize that each successive octet of bits (starting at the lower right corner of the geodetic LSAM and going left eight longitude pixels before advancing one latitude pixel) allows for a process to identify which pixel address is to be checked whenever the lat/long of a MS is provided to the LSU 184. FIGS. 18A–18C show how the LSU 184 data are stored in memory addresses and also identifies the simple steps taken by the LSU 184 or MLU 218 to retrieve the appropriate information.

The formula at the bottom of FIG. 12 shows that each geodetic LSAM's origin latitude and longitude can be calculated during the actual programming of the complete LSAM for any property (see FIG. 13). Utilizing the quadtree numbering nomenclature illustrated in FIG. 11, it is obvious that only those LSAMs containing LoCATE properties need to be programmed if the purpose of the LoCATE surveillance system is simply to notify on-site security or police of on-going 911 calls in progress from these specific properties. However, an advantage of the LoCATE surveillance system is use by law enforcement to set up geodetic LSAMs that address specific areas in a city or metropolitan area without regard to property boundary issues. This greatly simplifies the programming and operational difficulties of using an MLU in real-time to set up immediate surveillance areas in response to suspected terrorist acts or crimes. The number of possible surveillance areas can become quite large because the number of possible surveillance areas varies as 4 to the power of the LSAM Level (e.g., 4,096 surveillance areas for Level 6 LSAMs and 65,536 for Level 8 LSAMs).

The LSU 184 uses geodetic LSAMs and property LSAMs as described below to retrieve the appropriate third-party phone that corresponds to the LoCATE surveillance area 266 that includes the location of the MS 256 in a 911 call. This is illustrated for Property 1 in FIG. 13. First, Property 1 is encoded as shown under the grid of FIG. 13 and then programmed in the LSU 184 relational database by selecting the appropriate geodetic LSAM (xxxxxxxxx) and filling in the pixel map data that supports the exact position of the property in each geodetic LSAM. The pixels are numbered 1 through 64, beginning with the lower right corner of the LSAM, and are arranged in eight rows and eight columns.

When the LSU 184 receives a MS lat/long reading, the LSU 184 first locates the right corner origin of the single geodetic LSAM (at the lowest level of geodetic LSAM resolution, for example, level 9 in FIG. 13) that contains the MS lat/long coordinates (described below). This particular geodetic LSAM is now the only point of reference for further calculation by the LSU 184. The LSU 184 then calculates the exact pixel in the LSAM that contains the location of the MS 256 (described below). The associated database for this pixel is shown in FIG. 18B as Variables 9 through 12, and the authorized third-party phone (Variable 11) is chosen to connect to the MS 256 and the PSAP 254. The LSU 184 provides this number to the MSC 108 so that the MSC 108 can set up the three-way call at the earliest point after the MS 256 and the PSAP 254 are connected. The LSU 184 includes the database and general programming needed for any computer server with at least a 32-bit processor, high speed RAM, and read-writable DVD to backup information in a redundant manner such that the LoCATE system can reboot with all data once power is restored. The variables for the locate database 166 are included in FIGS. 18A–18C and the operation is described below for the E-911 Phase 1 and Phase 2 networks.

When the MLU 218 contacts the LSU 184, the MLU 218 provides either the code number for a particular property (already stored in the LSU 184) or the geodetic LSAM numbers (typically LSAM Levels 7, 8, or 9, but lower levels, such as 10 or 11 can be utilized with the understanding that the ALI positional error for a MS can produce significant error for very small LSAMs). Although the error is large for small LSAMs (e.g. typical a-GPS circular error area is approximately 16,400 ft$^2$ as depicted in FIG. 13), a 911 caller standing on the boundary of a geodetic or property LSAM has a 50% probability of being inside the LSAM. In many situations the 8,200 ft$^2$ outside the LSAM is close enough to not matter unless there is a building or obstruction nearby that would make an on-site response difficult or inappropriate. In those cases, as previously discussed, there are some alternate operational procedures that can be applied.

Once the MLU 218 user identifies the LSAMs of interest from either a special list or a metropolitan map with a LSAM overlay, the user would type the list of encoded LSAMs (either geodetic or property) and send the list via the user's cellular phone (wireless MLU) or his wired phone or internet connection (wired MLU) in a manner that would provide both the MLU 218 identity to the LSU 184 and authorize the LSU 184 to send either the phone number of the MLU 218 or a time-stamped listing of 911 calls from the requested LSAMs. During the period of operation of the LSU 184, the LSU 184 stores each callback number along with the LSAM of origin, resulting in a real-time log of calls being held in a memory cache for a period of time (described below in more detail), so that the MLU 218 can analyze the call frequency statistics for certain LSAMs.

The operation of the MLU 218 is described in more detail below, along with the calculations and memory jumps that must be programmed into these units. As previously mentioned, the delivery and receipt of data from the MSC 108 is controlled by the proprietary hardware/software in place and the MLU 218 must be compatible with this infrastructure to ensure no errors in operation. However, the LSU 184 only needs to be provided the lat/long data at the correct time as previously described in the description of the MSC 108 to LSU 184 interface (see FIGS. 14 and 15 and accompanying descriptions). The LSU 184 is a standard computer server that is easily accessed by the MSC 108 and the MLU 218. If the use of an MLU 218 is authorized for the LSU 184, then the LSU 184 server must also include a network transmission card (e.g., modem or ethernet card) and associated COTS communication software to allow the LSU 184 and the MLU 218 to directly communicate in the request and transfer of desired LSAM data from the LSU 184 data cache to the MLU 218.

The Phase 2 LSU 184 is equipped with a COTS relational database that addresses in memory the specific identifier nomenclature for each geodetic LSAM and property LSAM along with geodetic LSAM origin coordinates and property LSAM bit maps and additional data such as LAPs/LSPs and authentication dates, while receiving and storing MS callback numbers in special memory addresses for temporary cache of 911 calls from each LSAM. The LSAM origin coordinates and property bit maps are programmed into the LSU 184 as required to include all geodetic areas of interest and all subscribers to the LoCATE surveillance service. The actual lat/long data can come from a simple text listing of GPS waypoints provided by a local business or institution to precise maps already developed and certified by the local Emergency Management Organization (EMO). The E-911 Phase 1 LSU 184 does not require any LSAM construction because it is only necessary that it respond to the MSC's identification of BS, cell, or tower sector (depending on the particulars of the wireless Emergency Network) and provide LAPs and authentication dates while storing each callback number relative to BS, cell, or tower sector for access by the MSC 108 in setting up three-way calls with the LAP, the MS 256, and the PSAP 254 or by the MLU 218 in recording the time-tagged history of calls for use by the MLU 218. Because the surveillance areas are large, most phone numbers would probably be LSPs for law enforcement in the general area with some LAPs for on-site security or law enforcement at customer properties in micro-cells or pico-cells.

The MLU 218 is an integrated unit that consists of a phone, a processor, and a network communication card to pass data from the computer to the MSC 108 via the established network communication system (i.e., cellular, PSTN 110, satellite, or any direct link). As discussed below, the MLU 218 can operate in several modes, depending on the intended use. The hardware configuration is flexible and can either consist of completely separate phone and computer/communication card to receive calls and LSU 184 cache data (i.e., Variables 13 through 17 in FIG. 18C) to a totally integrated third generation phone/small computer that allows the simultaneous receipt of voice and LSU 184 cache data. The computer software for the MLU 218 includes a COTS operating system, COTS network communication software, COTS mapping software with a custom overlay of the LSAMs of interest in the metropolitan area (an optional paper map with drawn LSAMs is an alternative), and the specific software necessary to operate in the modes of operation identified below.

The mapping software can be at any level of sophistication from COTS software such as Microsoft® Streets and Trips or DeLorme's Street Atlas USA® to sophisticated GIS mapping software, such as ESRI's ArcView® that allows additional information to be stored to describe the LSAM location.

The geodetic LSAMs chosen include the numbering scheme utilized by the LSU 184 and the property LSAMs identify the coded property nomenclature. The MLU 218 can also be utilized to develop new property LSAMs by simply plotting the waypoints from the provided lat/long maps (available in the inexpensive COTS mapping software), recording actual GPS receiver waypoints gathered by on-site security performing a simple survey, or by comparing the COTS mapping program with a CAD developed overlay of LSAMs to the official EMO furnished maps. Although the MLU 218 could be utilized to develop the actual bit-map for a property LSAM and transmit the data to the LSU 184 for storage, it is inappropriate to do this in real-time because it is extremely important that the LSAM correlates with the EMO maps of the metropolitan area. Therefore, the development of LSAMs should be done off-line and actually verified before being programmed into the LSU 184.

One optional feature that the MLU 218 may include for homeland security purposes is a special priority code (Variable 8 in FIG. 18A) that allows the LSU 184, upon authorization by local government, to give top priority to a particular MLU 218 to participate in voice connections from identified LSAMs, both geodetic and property. An optional feature that may be added to the LSU 184 for the specific usage by a MLU 218 is the memory cache (Variables 13 through 18 of FIG. 18C) that specifically stores the callback number of MSs involved in 911 calls along with the times of call initiation and call completion as provided by the MSC 108 in accordance with J-STD-036.

To avoid privacy issues regarding callback numbers, a special reduced list of MLUs would be authorized only to receive the full information (with callback numbers) for display on a MLU. All other MLUs would be allowed to simply show the number of calls initiated/completed with time tags over an extended time period for the MLU 218 user to perform qualitative analysis of 911 activities at a selected number of LSAMs. In this scenario, the MLU 218 could be used in a similar manner to a police band scanner that alerts all emergency or law enforcement organizations to possible real-time emergencies that are occurring in the specific LSAMs of interest to them. The LSU 184 would simply output the LSAM number with associated callback number, and time intervals for initiation and completion of the 911 calls. However, the MLU 218 could be further programmed by the user with COTS software to display this information in histogram fashion for set time intervals during the day, thereby allowing for the preventive placement of surveillance personnel to deal with expected problems that appear due to high risk areas, times of day, etc.

As previously stated for the LSU 184, the E-911 Phase 1 MLU 218 would only address BS, cell, and tower sector instead of LSAMs, but would still utilize callback number and time-tagged call initiation/completion data in the same manner as the Phase 2 MLU. The MLU 218 may be utilized to both select existing LSAM's (Phase 2 MLU) or BS/cell/tower sector (Phase 1 MLU). Utilizing a wireless MLU 218 (with third generation phone), the MLU 218 user could receive all call-related digital data and actually participate (listen-talk, or just listen) in three-way conversations with the MS 256 and the PSAP 254 coming from LSAMs that are not assigned to an existing LAP.

The MLU 218 user could also communicate directly with special law enforcement or counter-terrorism units and provide direction on team response to a specific attack or crime, utilizing the frequency of 911 calls and voice conversations (overheard or participated in) from the exact LSAMs of interest, or could receive the data and actually direct other law enforcement (e.g., SWAT teams, FBI, National Guard). The actual digital printouts (or histograms) of 911 calls and associated LSAMs could be sent via the Internet or MSC 108 to local, state, or federal agencies specifically related to Emergency Management or Homeland Security. All LAPs associated with property LSAMs would retain the highest priority for voice calls. However, law enforcement and Homeland Security MLUs would have top priority on all 911 call history reporting from all LSAMs, both property and geodetic. In certain cases, special properties (e.g., national assets or strategic targets) might allow the MLU 218 to participate in the voice call between the MS 256 and the PSAP 254. However, this would not be expected if an adequate on-site security force exists to immediately respond to a threat or crime.

As previously mentioned, the MLU 218 could serve a very useful purpose to police, emergency services, and security personnel as a programmable equivalent of a police scanning receiver that shows the number of 911 calls in progress in their assigned surveillance areas, while also allowing the emergency/security personnel to selectively participate in the 911 calls if they are authorized. In a passive "observer" mode, the MLU 218 could be located in the field with any mobile team or connected to the national telecommunication network to monitor 911 calls in progress from any selectable LSAM within the United States. In an active "participant" mode, the MLU 218 could allow authorized law enforcement or security teams to establish surveillance zones in real-time and connect three-way to 911 voice calls from all selected geodetic LSAMs where an existing on-site security or police team is not currently authorized for three-way conversation with the MS 256 and the PSAP 254. Although technically possible, any priority override of existing security or police would certainly require extraordinary circumstances that would have to be authorized by local government and be agreed to by the LoCATE customer and the wireless provider.

The E-911 Phase 1 Interface to the LoCATE System

Referring to FIG. 14, the following describes the E-911 Phase 1 interface to the LoCATE System 402.

First, wired third-party phones 404 are connected to PSTN 110 and wireless third-party phones 406 are activated, authenticated, and connected to the wireless network. The MS 256 initiates a 911 call and connects via the BS 104 to the MSC 108. The MSC 108 identifies the ESRD (BS, cell, and sector identification (ID)), MS ID, and MS callback number and supplies this information to the ESME 252. The MSC 108 provides the ESRD to the LSU 184 and waits for the third-party phone number to be supplied by the LSU 184. The LSU 184 searches the locate database 166 for the authorized third-party phone number and supplies this number to the MSC 108.

The MSC 108 initiates a connection with the ESNE 250 and provides notification to the LSU 184 of a call in progress (with the callback number if allowed by local government), while the LSU 184 stores a digit indicating the 911 call is open. Once a connection is made between the PSAP 254 and the MS 256, the MSC 108 waits for a short time interval (either to assure reliable three-party connection or as mandated by local government) before attempting to connect to the third-party phone number. The MSC 108 allows a minimum time period (mandated by local government) for three-party connection to be completed before ending the three-party connection attempt. The MSC 108 notifies the LSU 184 of 911 call completion (call termination report) and the LSU 184 stores a digit indicating that the call closed.

When MLU 218 operation is included (including a wired MLU 218a and a wireless MLU 218b), the wired MLU 218a is connected to the PSTN 110 and the wireless MLU 218b is activated and connected to the wireless network. The MLU 218 requests the MSC 108 for data connection to the LSU 184 and the MSC 108 connects the MLU 218 directly to the LSU 184. The MLU 218 provides an identifier to the LSU 184 for a selected ESRD. The LSU 184 provides a text list of 911 calls from the selected area identified by the ESRD with call initiation/completion times to the MLU 218 and optional callback numbers if allowed by local government and authorized in the LSU184 database. Optionally, the LSU 184 provides the MLU 218 phone number to the MSC 108 as the third-party number for voice connection to the PSAP 254, based upon security prioritization digits for precedence over the authorized third party number.

The E-911 Phase 2 Interface to the LoCATE System

Figure 15:
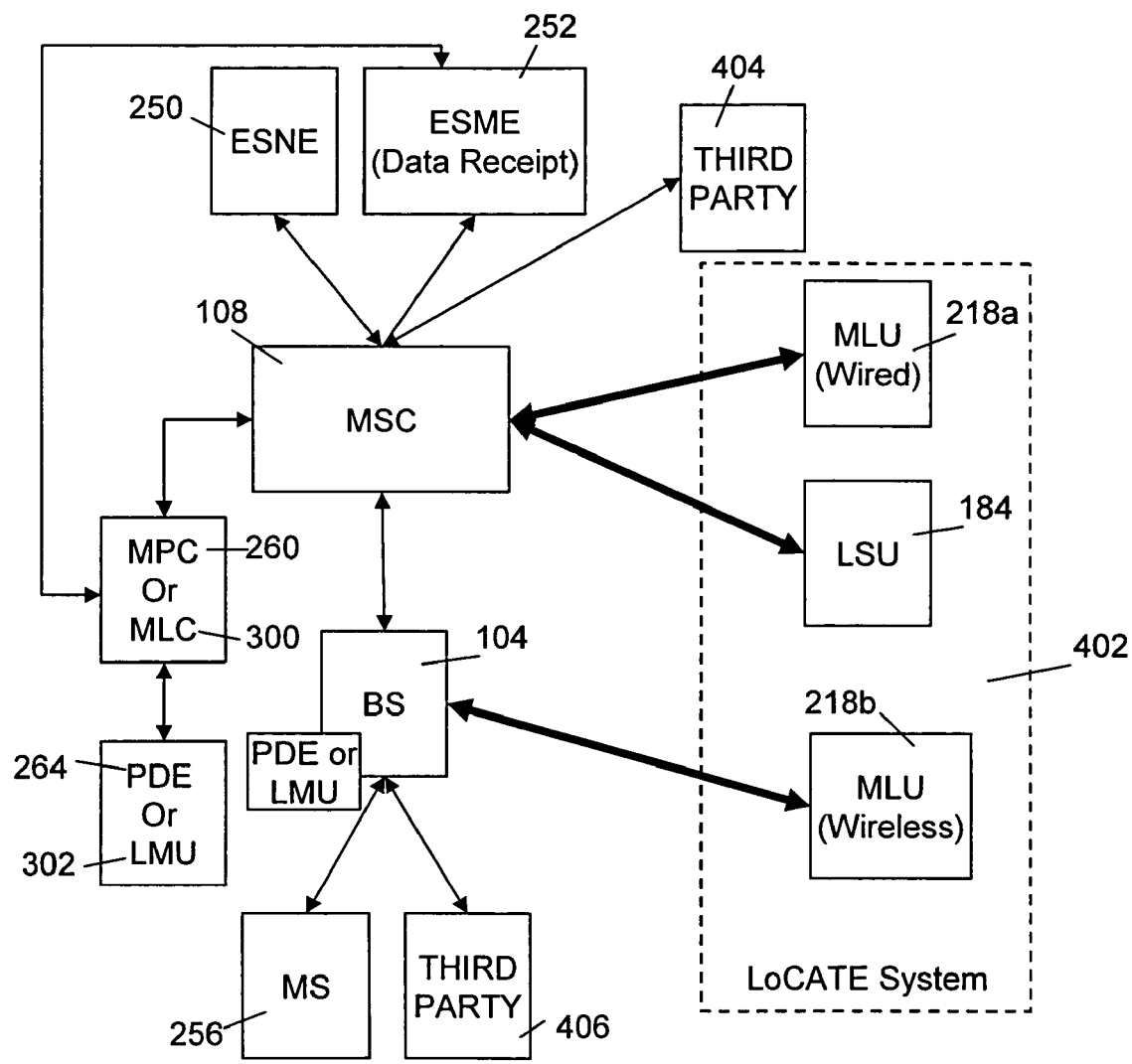
FIG. 15 is a block diagram illustrating the interfacing of the present invention to the FCC E-911 Phase 2 cellular network.

Referring to FIG. 15, the following describes the E-911 Phase 2 interface to the LoCATE System 402.

First, the wired third-party phone 404 is connected to the PSTN 110 and the wireless third-party phone 406 is activated, authenticated, and connected to the wireless network. The MS 256 initiates a 911 call and connects via the BS 104 to the MSC 108. The MSC 108 bypasses the home location register (HLR) in the home database 160 and the visitor location register (VLR) in the visitor database 162 to accept the MS 256 as a valid phone in accordance with FCC regulations. The MSC 108 assigns a cache to temporarily store critical information necessary to initiate/complete the voice/data portions of the 911 call.

Depending on the design of the wireless network, the MSC 108 either pushes location data (BS, cell, sector, lat/long) to the ESN 258 or the ESN 258 pulls the location data. The primary techniques to connect voice and position data to the ESN 258, as described in J-STD-036, are summarized below for both the ANSI-41 and PCS-1900 wireless system.

a. Technique 1. The PDE 264 (or LMU 302) autonomously pushes lat/long data octets to the MPC 260 (or MLC 300) for later retrieval by the ESME 252. During this operation, the MSC 108 sets up the voice call to the ESNE 250 while using the ESRD, the callback number, or the MS IMSI (International Mobile Subscriber Number) as a system identifier for all related network data movement related to the call. The call identifier and related position information is cached in the MPC 260 (or MLC 300).for eventual retrieval by the ESME 252 during the call.

b. Technique 2. The MSC 108 requests the MPC 260 (or MLC 300) to provide the lat/long of the MS 256 for inclusion in the call setup to the ESNE 250. This operation is controlled by a position timer (POST). At the end of the POST interval, the MSC 108 sends the voice call with call identifier octets to the ESNE 250. The MSC 108 then sends an update request to the MPC 260 (or MLC 300) with a request for the lat/long of the MS 256.

c. Technique 3. The MSC 108 routes the voice call to the ESNE 250 with call identifier octets while the ESME 252 autonomously requests the MPC 260 (or MLC 300) to supply lat/long at a later time in the 911 call. The ESME 252 stores the lat/long octets until the PSAP 254 asynchronously requests them.

d. Technique 4. The MSC 108 sets up a voice call with the ESNE 250 based on default position coordinates from the MPC 260 (or MLC 300) that are not within the accuracy requirements of the FCC mandate for Phase 2. The ESME 252 receives the call identifier octets and pulls the updated lat/long for storage and retrieval by the PSAP 254.

The MSC 108 provides the LSU 184 with the lat/long of the MS 256 at the earliest possible point in the voice call setup to the ESNE 250. This is an operational sequence by the MSC 108 during a time period smaller than the POST period in which the MSC 108 waits for (1) the MPC 260 (or MLC 300) to determine the lat/long, (2) the lat/long to be transferred to the LSU 184, and (3) the LSU 184 to return the third-party phone number to the MSC 108 for a standard three-party conference call setup by the MSC 108. This period of time is referred to as the $t_{LSU}$ and is primarily affected by the network protocol in regards to E-911 reporting. The $t_{LSU}$ is much smaller than the time period required for a moving MS 256 to exit from a surveillance area.

For example, a MS 256 moving at a speed of 70 mph could move 31 meters in 1 second. Therefore, an E-911 network with ALI reporting times of many seconds will not be accurate in reporting the location of an observed event on highways, but would still allow for LoCATE surveillance areas 266 to be applied to pedestrian areas or areas where high speed exits are not possible (e.g., parking areas or controlled exit areas). An ALI system with the $t_{LSU}$ optimized to allow a high speed MS 256 to move no more than a distance equal to the positional accuracy of the FCC E-911 Phase 2 mandates (50 or 150 meters) is desired. However, increasing the size of the surveillance zone or adding controls to slow the movement of the MS 256 would be acceptable alternatives. In addition to the effect of the $t_{LSU}$, the LSU 184/MSC 108 interface requires customization to operate with the particular lat/long delivery techniques described above. These lat/long delivery techniques affect the LSU 184 to MSC 108 interface in regards to delivery of third party numbers as follows:

a. For the NCAS lat/long delivery technique described above as Technique 1, the lat/long of the MS 256 is autonomously pushed to the MPC 260 (or MLC 300) for later retrieval by the ESME 252. In this scenario, the lat/long octets may or may not pass through the MSC 108 because the MPC 108 could be wired directly to the ESME 252. Therefore, the LSU 184 must receive the lat/long from the MPC 260 (or MLC 300), either by the MPC 260 (MLC 300) pushing the lat/long to the MSC 108 or the MSC 108 retrieving the lat/long for the LSU 184 to supply the authorized third-party number. In this scenario, the LSU 184 would provide the correct third party number for connection to the voice call with the PSAP 254 independently of whether the PSAP 254 requested the lat/long for the MS 256.

b. For the CAS lat/long delivery technique described above as Technique 2, the lat/long of the MS 256 are included with the voice call setup to the ESNE 250 and the MSC 108 waits for the $t_{LSU}$ period after delivery of the lat/long by the MPC 260 (MLC 300). The MSC 108 initiates the voice call to the ESNE 250 immediately upon lat/long delivery and simply supplies the third-party number after the $t_{LSU}$ period. However, a slower $t_{LSU}$ may warrant a delay by the MSC 108 to assure that the third party 404, 406 is connected early in the voice call. If the POST interval expires without delivery of lat/long, it may be appropriate to stop the LSU 184 search for the third party number. This decision will depend on the size and type of surveillance areas (e.g., pedestrian areas can be acceptable, whereas highways would not be acceptable).

c. For the NCAS lat/long delivery technique described above as Technique 3, the MSC 108 sets up the voice call to the ESNE 250 while the ESME 252 autonomously requests the MPC 260 to supply lat/long at a later time in the 911 call for storage in the ESME 252. Because there is no specified time for the lat/long to be pulled by the ESME 252, the LSU 184 receives the lat/long early in the voice connection to the PSAP 254. This is achieved by the MPC 260 pushing the lat/long to the LSU 184 or the MSC 108 pulling the lat/long from the MPC 260 independently of the ESME 252. The value of the $t_{LSU}$ period impacts the operation of the LSU 184 in this mode.

d. For the NCAS lat/long delivery technique described above as Technique 4, the MSC 108 sets up a voice call with default position coordinates from the MPC 260 and the ESME 252 pulls updated lat/long for later retrieval by the PSAP 254. The accuracy of the default position coordinates and the time delay in the ESME 252 pulling the updated lat/long affect LSU 184 delivery of the third party number in this mode. If the default position is merely E-911 Phase 1 position (i.e., cell, tower, or sector), then the third party number should primarily be law enforcement. If the lat/long update can be available from the MPC 260 (MLC 300) within the POST interval, the LSU 184 may be beneficial for surveillance of pedestrian areas or vehicle areas with controlled exit speeds. If the default position accuracy is much closer to the E-911 Phase 2 mandate, then the LSU 184 would also be acceptable for larger properties without MS 256 exit speed limitations.

The MSC 108 initiates a voice connection with the ESNE 250 and provides notification to the LSU 184 of a call in progress (with the callback number if allowed by local government), while the LSU 184 stores a digit indicating a 911 call is open. Once a connection is made between the PSAP 254 and the MS 256, the MSC 108 waits for a short time interval (either to assure reliable three-party connection or mandated by local government) before attempting to connect to the third-party phone number. The MSC 108 allows a minimum time period (mandated by local government) for three-party connection to be completed before dropping the three-party connection attempt. The MSC 108 notifies the LSU 184 of 911 call completion through a call termination report, and the LSU 184 stores a digit indicating the call is closed.

When MLU 218 operation is included (including a wired MLU 218a and a wireless MLU 218b), the wired MLU 218a is connected to the PSTN 110 and the wireless MLU 218b is activated and connected to the wireless network. The MLU 218 requests the MSC 108 for data connection to the LSU 184 and the MSC 108 connects the MLU 218 directly to the LSU 184. The MLU 218 provides an identifier to the LSU 184 for selected properties within the LSAM SS. The LSU 184 provides a text list of 911 calls from the selected property map with call initiation/completion times to the MLU 218. Optionally, the LSU 184 provides the MLU 218 phone number to the MSC 108 as the third-party number for voice connection to the PSAP 254, based upon security prioritization digits for precedence over the authorized third party number.

Operation of the LoCATE System Unit (LSU) for the E-911 Phase 2 System

Referring to FIGS. 18A–18C, the following describes the operation of the LSU 184 in more detail.

The LSU 184 reads the callback number and the lat/long of the MS 256 as provided by the MSC 108. The LSU 184 stores the callback number in the address for Variable 13 and includes the Variable 16 time marker (specifically for later use by the MLU 218 as described later). The LSAM (1) origin lat/long is subtracted from the MS 256 lat/long to derive a relative MS lat/long, which is stored in the address for Variable 14.

A reference latitude ($LAT_{REF}$) is determined of those LSAMs that might contain the latitude of the Variable 14 entry. All LSAM data entries are sorted based on increasing order of magnitude for Variable 2 and, starting with the smallest number, add Variable 4 for an LSAM Level 9 entry (i.e., 0.00125) to derive Variable A. Variable A is calculated and compared to the latitude for the Variable 14 entry. Each LSAM (Variable B) is identified that corresponds to Variable A-Variable 14 (latitude) <0.00125. Variables 1–3 are temporarily stored for each Variable B in a new memory location (ADDRESS A), which is sorted on increasing order of magnitude for Variable 3.

Variable 5 is added for an LSAM Level 9 entry (i.e., 0.00125) to each Variable 3 in ADDRESS A to derive Variable C. Variable C is compared to the longitude for the Variable 14 entry. The unique LSAM is identified that corresponds to Variable C-Variable 14 (longitude)<0.00125. This unique LSAM, referred to as LSAM (U), contains the location of the associated MS call.

The corresponding Variable 8 for the LSAM (U) is read to determine if a security override condition exists. If LSAM override is authorized, the Variable 6 is reported to the MSC 108. If LSAM override is not authorized, then the operation in the next paragraph is performed. If no LSAM (U) was determined, then the MS 256 call is not coming from any LSAM currently loaded into the LSU 184 memory and the LSU 184 must respond to the MSC 108 with all zeroes or some special number that alerts the MSC 108 not to attempt to add a third-party phone to the ongoing 911 call.

Next, the exact pixel location in the LSAM (U) that contains the location of the 911 call is determined. This is done by counting the exact number of pixels from the origin of the LSAM (U). The LSAM (U) contains 64 pixels (8 rows by 8 columns) which are coded as shown for Variables 9 through 12 in FIG. 18B. The counting process to determine the exact pixel is as follows. The exact row and column of the pixel is calculated by solving the following set of equations and extracting the integer from the derived ROW and COLUMN:

[Variable 14 (Latitude)−Variable $2_{LSAM\ (U)}$]/ 0.00125=ROW/8

[Variable 14 (Longitude)−Variable $3_{LSAM\ (U)}$]/ 0.00125=COLUMN/8.

To access the correct customer information contained in Variables 9 through 12, the ROW and COLUMN of a single pixel are converted to the pixel number in the Variable 9 pixel map. The pixel number is calculated according to the following equation:

[ROW (Integer)×8]+COLUMN (Integer)=Pixel Number.

Variable 11 for the pixel number is retrieved and provided to the MSC 108 as the third-party number. If there is no Variable 11 for the particular pixel, then Variable 6 for the LSAM (U) is provided to the MSC 108 as the third party in the 911 call. If no Variable 6 exists for the LSAM (U), then the LSU 184 simply returns a Variable 11 input to the MSC 108 as all zeroes or a special code that signifies no LoCATE third-party phone.

Upon notification by the MSC 108 of call completion associated with the Variable 13 callback number, the LSU 184 denotes the time of notification as Variable 17 for the 911 call. The size or time duration of the LSU 184 cache for 911 calls can be increased to as long as necessary for Homeland Security or other emergency management or crime prevention groups to obtain data to support event management (e.g., parades, sports events, public gatherings, etc.) or the gathering of statistical data for strategic planning related to crime prevention (e.g., in high crime areas) or surveillance for terrorist actions (e.g., by multiple LSAMs containing all terrorist targets in a metropolitan area).

The Modes of Operation of the MLU in the E-911 Phase 2 System

The following describes the modes of operation of the MLU 218.

Mode 1. The MLU 218 receives the output of the LSU 184 cache (Variables 13–17 in FIG. 18) and displays the listing of 911 calls coming from the chosen LSAMs. The MLU 218 may be, for example, a fixed desktop computer or a wireless phone/notebook computer communicating with the MSC 108 via TCP/IP protocol. The MLU number is shown in Variable 6 and the MLU Authentication Variable 8 is coded for data receipt (Codes 3 and 4) for each chosen LSAM, and the LSU 184 scans the complete LSU cache for each call coming from the chosen LSAMs and provides the data to the LSU network communication card for transfer to the MLU 218.

Mode 2. The MLU 218 is used, typically at the local metropolitan level, for voice connection to any 911 call coming from the selected LSAMs. The MLU 218 is utilized to select the LSAMs of interest for third-party voice connection to a 911 call and the MLU 218, as described above, is listed as a LoCATE Security Phone (LSP) (Variable 6) with appropriate security override authorization (Variable 8, Code 2) for each LSAM. The LSP differs from the LAP (LoCATE Authorized Phone) in that the LAP is the on-site security phone for a particular physical location (business, institution, etc.) that is identified by the individual pixels within a LSAM. The LSP is a phone that is authorized for the entire LSAM, but is only referenced when a LAP does not exist for the particular pixel that contains the source of a 911 call. The MLU 218 can be used to acquire a real-time data listing of all calls from the LSAM, including the pixels in which LAPs exist. The police or Homeland Security may have both LSP and MLU authorization for a particular LSAM.

Mode 3. The MLU 218 can be utilized to both receive voice connection from certain LSAMs and LSU cache data for other LSAMs. This may be achieved in a variety of ways from a single wireless third generation handset (operating with voice and data simultaneously) to separate phone and computer operating independently with voice connection on the PSTN 110 or cellular network and LSU cache data delivered via TCP/IP protocol on different transmission networks.

The Operation of the MLU in the E-911 Phase 2 System

The following describes the modes of operation of the MLU 218 in greater detail.

Mode 1

The MLU 218 user identifies from available metropolitan map and LSAM overlays, the particular geodetic LSAMs to be monitored for 911 call occurrences and types the LSAM nomenclature (i.e., ASCII code) into a text listing utilizing the available network communication software to place the data in the corresponding holding registers for transmitting data.

The phone number assigned to the LSU 184 network communication card is typed into the MLU 218 communication software along with a special ASCII-2 code for the phone number of the MLU 218, special MLU user identity verification codes (Variable 8 Codes 3 and 4), and requested LSU 184 cache processing period (in minutes or hours). The MLU network card is then activated to begin the handshake process and signaling to prepare both network cards for data transfer to the LSU 184.

As the MLU 218 transmits the LSAM listing to the LSU 184, the LSU 184 stores the LSAM codes in the appropriate receiver holding buffers assigned to the network communication card. The LSU 184 reads the MLU 218 phone number and security authorization codes from the receiver FIFO registers, compares the information to Variables 6, 7, and 8 to determine if the MLU 218 is authorized for receipt of the LSU cache data. If the MLU 218 is authorized, the LSU 184 continues to store the data in memory addresses to begin the operation described in the next paragraph. If the MLU 218 security override is not acceptable, the receiver holding registers are erased and the phone connection is broken.

The LSU 184 compares the lists of LSAMs from the MLU 218 to Variable 15 in the LSU cache and compiles a special listing of Variable 13 (if authorized) and Variables 14 through 17 for transfer to the transmitter holding buffers assigned to the LSU network communication card.

The requested data are transmitted back to the MLU 218 and the MLU 218 displays the contents of its receiver holding registers to the MLU user as a text listing of information. At the completion of the MLU requested cache processing time, the LSU 184 drops transmission to the MLU 218 and resumes operations as before.

The MLU user may use custom software to arrange the data into histograms or other graphical formats.

Mode 2

The MLU user identifies from available metropolitan map and LSAM overlays, the particular geodetic LSAMs to be monitored for 911 call occurrences and types the LSAM nomenclature (i.e., ASCII code) into a text listing utilizing the available network communication software to place the data in the corresponding holding registers for transmitting data.

The phone number assigned to the LSU network communication card is typed into the MLU communication software along with a special ASCII-2 code for the phone number of the MLU 218, special MLU user identity verification codes (Variable 8 Codes 3 and 4), and the requested LSU cache processing period (in minutes or hours). The MLU network card is then activated to begin the handshake process and signaling to prepare both network cards for data transfer to the LSU 184.

As the MLU 218 transmits the LSAM listing to the LSU 184, the LSU 184 stores the LSAM codes in the appropriate receiver holding buffers assigned to the network communication card. The LSU 184 reads the MLU phone number and security authorization code from the receiver FIFO registers, compares the information to Variables 6, 7, and 8 to determine if the MLU 218 is authorized as a LSP for the requested LSAMs. If the MLU 218 is authorized, the LSU 184 compiles a listing of Variable 1 entries from the LSAMs that the MLU 218 has requested and the LSU cache is continuously checked for matching Variable 15 LSAMs so that the MSC 108 receives the MLU number as the LSP at the time of call initiation. Until the requested MLU processing time is complete, the LSU 184 ignores all other LSAMs that include the MLU 218 as the LSP. If the MLU 218 security override is not acceptable, the LSU 184 drops transmission to the MLU 218 and resumes operations as before. phone number of the MLU 218, special MLU user identity verification codes (Variable 8 Codes 2 and 3 or 4), and the requested LSU cache processing period (in minutes or hours). The MLU network card is then activated to begin the handshake process and signaling to prepare both network cards for data transfer to the LSU 184.

As the MLU 218 transmits the LSAM listings to the LSU 184, the LSU 184 stores the LSAM codes in the appropriate receiver holding buffers assigned to the network communication card. The LSU 184 first reads the LSAM voice listing and follows the Mode 2 security authorization process to determine if the MLU 218 is authorized as a LSP for the requested LSAMs. The LSU 184 then reads the LSAM data listing and follows the Mode 1 security authorization process to determine if the MLU 218 is authorized to receive the LSU data cache for the selected LSAMs.

If the security authorization for both voice and data listings is not acceptable, the LSU 184 disconnects the MLU 218 and empties&s the LSU receiver holding registers. If the authorization if acceptable, the LSU 184 compiles a listing of Variable 1 entries from the selected LSAMs and scans the LSU cache continuously for matching Variable 15 LSAMs so that the MSC 108 receives the MLU voice number as the LSP at the time of call initiation, and the LSU data cache for the selected LSAMs is provided to the MLU data number.

Until the requested MLU processing time is complete, the LSU 184 continues providing a separate voice connection and data stream for only the LSAMs listed. At the completion of the MLU requested cache processing time, the LSU 184 drops transmission to the MLU 218 and resumes operations as before.

Although the connection of a nearby first responder to a 911 caller only requires a simple mobile phone, a MLU 218 can instruct the LSU 184 in the MSC 108 to tailor surveillance areas and provide 911 call displays to the user on a geographically accurate map showing all surveillance areas of interest. The MLU 218 may also be used to keep all first responders in a metropolitan area aware of the quantity and location of 911 calls in progress. The MLU 218 may be connected to a standard telephone system and linked to the LSUs 184 in MSCs 108 in many locations to create surveillance areas in response to special events, homeland security alerts, special intelligence, or real-time emergency scenarios.

As described above, the present invention uses the ability of the E-911 system to identify the location of a 911 caller and correlates the location information with the location of nearby authorized first responders to achieve the fastest possible response to a catastrophic event or attack. The present invention works in conjunction with the 911 emergency system to inform either on-site security or nearby law enforcement of a 911 call in progress by linking the security or law enforcement personnel to the 911 caller and to the 911 dispatcher. The on-site security or nearby law enforcement personnel may also use a mobile LoCATE unit or MLU to modify their chosen surveillance areas to either link to individual 911 calls or to track all current 911 emergencies. For a cellular system compliant with the FCC E-911 Phase 2 location accuracies, the present invention may be applied to any precisely mapped area within any cellular coverage region. Possible surveillance applications include buildings, campuses, national monuments, crime zones, airports, sports arenas, parades, amusement parks, bridges, highways, rivers, etc.

The present invention is applicable to existing 2.0 generation digital wireless systems (i.e., TDMA, CDMA, GSM), advanced systems (i.e., 2.5 generation systems such as GPRS and EDGE), and future systems (i.e., 3.0 generation systems). The present invention may be implemented on a national scale because it has a small impact on the cellular infrastructure and it basically operates within the current 911 system, with essentially no impact to the cellular customer in terms of new equipment or training.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

What is claimed is:

1. A method of initiating a telecommunication connection between a wireless 911 caller, an emergency 911 dispatcher, and surveillance property security/law enforcement personnel, the method comprising:
   identifying a surveillance property from which a wireless 911 caller makes an emergency 911 call to the emergency 911 dispatcher;
   identifying the surveillance property security/law enforcement personnel, the surveillance property security/law enforcement personnel being located on the premises of the surveillance property or specifically authorized for 911 emergency surveillance of the surveillance property from remote locations; and
   initiating a telecommunication connection between each of the wireless 911 caller, the emergency 911 dispatcher, and the surveillance property security/law enforcement personnel, at the time the emergency 911 dispatcher initially receives the emergency 911 call, to alert the surveillance property security/law enforcement personnel of an on-site emergency occurring at the surveillance property prior to arrival of emergency personnel dispatched by the emergency 911 dispatcher.

2. The method of claim 1, wherein said identifying the surveillance property comprises receiving automatic location identification (ALI) data of the emergency 911 call and identifying the surveillance property associated with the ALI data.

3. The method of claim 2, wherein said identifying surveillance property security/law enforcement personnel comprises using the ALI data to search a database for the surveillance property and select phone numbers surveillance property security/law enforcement personnel that are authorized to monitor a 911 call in progress from the surveillance property.

4. The method of claim 3, wherein the surveillance property security/law enforcement personnel associated with the surveillance property are prioritized and wherein said identifying the surveillance property security/law enforcement personnel further comprises identifying one of the surveillance property security/law enforcement personnel that has a highest priority level.

5. The method of claim 3, wherein the ALI data comprises a cellular tower and a minimum cellular unit area of the cellular tower in which the wireless 911 caller is located, and the minimum cellular unit area comprises that area reached by at least one of a base station, a tower, and a tower sector.

6. The method of claim 3, wherein the ALI data comprises a particular cellular tower and a particular minimum cellular unit area of the particular cellular tower in which the wireless 911 caller is located, and the particular minimum cellular unit area comprises that area reached by at least one of a macro-cell, a mini-cell, a micro-cell, and a pico-cell.

7. The method of claim 3, wherein
   said receiving ALI data comprises receiving a latitude and a longitude of the wireless 911 caller;
   said identifying a surveillance property further comprises generating a plurality of high-level surveillance area maps that contain latitude and longitude data describing perimeters of properties that are designated for 911 call surveillance and storing the high-level surveillance area maps in the database, and generating a low-level surveillance area map from one of the high-level surveillance area maps that contains the latitude and longitude of the wireless 911 caller; and
   said generating a low-level surveillance area map comprises dividing the high-level surveillance area map that contains the latitude and longitude of the wireless 911 caller into quadrants and repeatedly subdividing each quadrant into successively smaller quadrants, forming a quad-tree hierarchy of surveillance area maps of increasing resolution, to generate a the low-level surveillance area map that has a predetermined map size and that contains the surveillance property.

8. The method of claim 7, wherein said generating a low-level surveillance area map further comprises dividing the low-level surveillance area map into a predetermined number of geodetic surveillance area maps, and dividing each geodetic surveillance area map into a predetermined number of pixels arranged in a predetermined number of columns and a predetermined number of rows, the perimeter of the surveillance property occupying one or more of the pixels in one or more of the geodetic surveillance area maps, and wherein said identifying the surveillance property security/law enforcement personnel further comprises determining a pixel number of a specific pixel in a unique one of the geodetic surveillance area maps that contains the latitude and the longitude of the wireless 911 caller, and identifying the surveillance property security/law enforcement personnel corresponding to the pixel number.

9. The method of claim 8, wherein said determining the pixel number of the specific pixel that contains the latitude and the longitude of the wireless 911 caller comprises:
   numbering the predetermined number of pixels of the unique surveillance area map from right to left beginning with the lower right-hand corner of the unique surveillance area map, each pixel having a predetermined longitude size and a predetermined latitude size;
   determining an origin point longitude and an origin point latitude of the unique surveillance area map;
   starting with the origin point of the unique surveillance area map, successively adding the predetermined longitude size to the unique surveillance area map origin point longitude to determine which column contains the longitude of the wireless 911 caller and successively adding the predetermined latitude size to the unique surveillance area map origin point latitude to determine which row contains the latitude of the wireless 911 caller; and
   converting the row and column into the pixel number of the specific pixel in the unique surveillance area map that contains the latitude and the longitude of the wireless 911 caller.

10. The method of claim 9, wherein:
the predetermined number of pixels is 64, the predetermined number of columns is 8, the predetermined number of rows is 8, the predetermined longitude size is 0.00125, and the predetermined latitude size is 0.00125;
the row that contains the latitude of the wireless 911 caller is calculated according to the following equation: $ROW = ((LAT_{caller} - LAT_{origin})/LAT_{pixel}) \times R$;
the column that contains the longitude of the wireless 911 caller is calculated according to the following equation: $COL. = ((LONG_{caller} - LONG_{origin})/LONG_{pixel}) \times C$;
the pixel number is calculated according to the following equation: $PN = (ROW \times 8) + COL.$,
where
   ROW is the row that contains the latitude of the wireless 911 caller,
   $LAT_{caller}$ is the latitude of the wireless 911 caller,
   $LAT_{origin}$ is the origin point latitude of the unique surveillance area map, LAT$_{pixel}$ is the predetermined latitude size of each pixel of each geodetic surveillance area map, R is the predetermined number of rows of pixels of each geodetic surveillance area map, COL. is the column that contains the longitude of the wireless 911 caller, LONG$_{caller}$ is the longitude of the wireless 911 caller, LONG$_{origin}$ is the origin point longitude of the unique surveillance area map, LONG$_{pixel}$ is the predetermined longitude size of each pixel of each geodetic surveillance area map, C is the predetermined number of columns of pixels of each geodetic surveillance area map, and PN is the pixel number of the specific pixel in the unique surveillance area map that contains the latitude and the longitude of the wireless 911 caller.

11. The method of claim 2, wherein the surveillance property is identified before or at the time that the emergency 911 dispatcher receives the emergency 911 call, the time of identification being dependent upon a particular ALI parameter delivery technique for the emergency 911 call.

12. The method of claim 1, wherein the property surveillance area is one or any combination of a building, a business, a campus, a national monument, a sports arena, an airport, an amusement park, a bridge, a land area, and a body of water.

13. The method of claim 1, wherein the surveillance property comprises one or more individual properties that are grouped as a single surveillance area in response to a request for a spontaneous or infrequently requested surveillance event.

14. The method of claim 13, wherein the spontaneous or infrequently requested surveillance event is a gathering of a specified number of persons that requires emergency surveillance.

15. The method of claim 13, wherein the spontaneous or infrequently requested surveillance event is a disaster or crime scene.

16. A system for alerting surveillance property security/law enforcement personnel of an emergency 911 call in progress that originates from a surveillance property, and for tracking wireless 911 call activity from a particular surveillance property, the system comprising:

a surveillance property from which a wireless 911 caller within a wireless network makes the emergency 911 call to an emergency 911 dispatcher;

a Localized Cellular Awareness and Tracking of Emergencies (LoCATE) System Unit (LSU) receiving automatic location identification (ALI) data of the emergency 911 call; and a LoCATE database storing phone numbers of the surveillance property security/law enforcement personnel who are located on the premises of the surveillance property or specifically authorized for 911 emergency surveillance of the surveillance property from remote locations, wherein the LSU uses the ALI data to search the LoCATE database for the surveillance property associated with the ALI data and for one or more phone numbers of the surveillance property security/law enforcement personnel associated with the surveillance property, sends the phone numbers of the surveillance property security/law enforcement personnel to the wireless network, and requests that the wireless network establish a connection between the wireless 911 caller, the emergency 911 dispatcher, and the surveillance property security/law enforcement personnel at the time of the emergency 911 call origination to alert the surveillance property security/law enforcement personnel of an on-site emergency occurring at the surveillance property prior to arrival of emergency personnel dispatched by the emergency 911 dispatcher.

17. The system of claim 16, wherein the phone numbers stored in the LoCATE are prioritized and the LSU searches the LoCATE database for the surveillance property security/law enforcement personnel having a highest priority level.

18. The system of claim 16, wherein:

the ALI data of the emergency 911 call comprises a latitude and a longitude of the wireless 911 caller, the LoCATE database comprises a plurality of high-level LoCATE surveillance area maps (LSAMs) containing latitude and longitude data describing perimeters of properties that are designated for 911 call surveillance, and the LSU searches the LoCATE database to identify one of the high-level LSAMs containing the surveillance property that corresponds to the latitude and the longitude of the wireless 911 caller.

19. The system of claim 18, wherein a low-level LSAM that contains the surveillance property is generated by dividing the high-level LSAM containing the latitude and the longitude of the wireless 911 caller into quadrants and repeatedly dividing each quadrant into successively smaller quadrants, forming a quad-tree hierarchy of LSAMs of increasing resolution, to generate the low-level LSAM that has a predetermined map size and that contains the surveillance property.

20. The system of claim 19, wherein the low-level LSAM is divided into a square array of a predetermined number of geodetic LSAMs, and each geodetic LSAM is divided into a square array of a predetermined number of pixels arranged in a predetermined number of columns and a predetermined number of rows, the perimeter of the surveillance property occupying one or more of the pixels in one or more of the geodetic LSAMs, and wherein the phone numbers of the surveillance property security/law enforcement personnel are identified by determining a pixel number of a specific pixel in a unique one of the geodetic LSAMs that contains the latitude and the longitude of the wireless 911 caller, and using the pixel number to identify the corresponding phone numbers of the surveillance property security/law enforcement personnel.

21. The system of claim 20, wherein the surveillance property is represented by a combination of bit maps of the geodetic LSAMs containing the surveillance property.

22. The system of claim 20, wherein the unique LSAM that contains the latitude and the longitude of the wireless 911 caller is determined by searching all of the high-level LSAMs in the LoCATE database for the LSAMs having a latitude that differs from the latitude of the wireless 911 caller by less than a predetermined amount, and a longitude that differs from the longitude of the wireless 911 caller by less than the predetermined amount.

23. The system of claim 22, wherein:

the specific pixel that contains the latitude and the longitude of the wireless 911 caller is determined by numbering the predetermined number of pixels of the unique LSAM from right to left beginning with the lower right-hand corner of the unique LSAM, each pixel having a predetermined longitude size and latitude size;

determining origin point longitude and latitude coordinates of the unique LSAM;

starting with the origin point of the unique LSAM, successively adding the predetermined longitude size to the unique LSAM origin point longitude to determine which column contains the longitude of the wireless 911 caller and successively adding the predetermined latitude size to the unique LSAM origin point latitude to determine which row contains the latitude of the wireless 911 caller; and converting the row and column into the pixel number of the specific pixel in the unique LSAM that contains the latitude and the longitude of the wireless 911 caller.

24. The system of claim 20, wherein the high-level LSAM has a map size of about 0.64° latitude by about 0.64° longitude, the low-level LSAM has a map size of about 0.01° latitude by about 0.01° longitude, each one of the geodetic LSAMs has a map size of about 0.00125° latitude by about 0.00125° longitude, and each one of the pixels has a map size of about 0.000156° latitude by about 0.000156° longitude.

25. The system of claim 20, wherein the low-level LSAM has a map size of about 0.4 square miles, each geodetic LSAM has a map size of about 0.00625 square miles,
and each one of the pixels has a map size of about 2,500 square feet.

26. The system of claim 18, further comprising a mobile LoCATE unit (MLU) that monitors a particular surveillance property selected by a user of the MLU, the MLU transmitting a surveillance area identifier for the particular surveillance property to the LSU, and the LSU returning to the MLU a list of 911 call initiation times, 911 call completion times, and callback numbers for use by the MLU in monitoring a history of 911 calls originating from the particular surveillance property.

27. The system of claim 26, wherein the LoCATE database contains a phone number of the MLU, and the LSU provides the phone number of the MLU to the wireless network for establishment of a connection between the MLU, the wireless 911 caller, and the emergency 911 dispatcher.

28. The system of claim 26, wherein the MLU operates interdependently with additional MLUs, LoCATE Security Phones (LSPs), and LoCATE Authorized Phones (LAPs) associated respectively with multiple surveillance properties to establish a security surveillance network for a geographical area comprising the multiple surveillance properties, with each MLU, LSP, and LAP participating in the 911 call or sending and receiving 911 data according to specified authorizations associated with the respective surveillance properties.

29. The system of claim 28, further comprising a master MLU communicating in the security surveillance network with all the MLUs, selected emergency personnel dispatched by the emergency 911 dispatcher, selected LSPs and LAPs, and the LSU, wherein the master MLU:

assigns the particular surveillance properties to the MLUs, receives voice information concerning 911 calls from-4he selected ones of the multiple surveillance properties and the emergency 911 dispatcher, receives data information concerning 911 calls from selected ones of the MLUs, provides response/commands to the MLUs, emergency 911 dispatcher, and the the selected LSPs and LAPs, communicates with the LSU to establish security surveillance coverage areas and receive wireless 911 call data from the selected surveillance properties, and communicates with the selected emergency personnel dispatched by the emergency 911 dispatcher to assess on-site emergencies and implement additional response/commands to members of the security surveillance network.

30. The system of claim 29, wherein the master MLU is programmable and contains electronic mapping software of metropolitan, state, or national areas for surveillance by a centralized authority.

31. The system of claim 28, wherein one or more of the MLUs are handheld units that are preprogrammed with LSAMs of interest and continuously receive a readout of 911 call history from the LSAMs of interest.

32. The system of claim 26, wherein the surveillance area identifier is an identifier of a particular base station, cell, or sector of an area in which surveillance is desired, and the MLU displays a map with the base station, the cell, or the sector overlaid on a local metropolitan map.

33. The system of claim 26, wherein the surveillance area identifier is an identifier of a particular LSAM of an area in which surveillance is desired, and the MLU displays the particular LSAM overlaid on a local metropolitan map to show a physical location of the particular LSAM.

34. The system of claim 26, wherein the particular surveillance property comprises one or more individual properties that are grouped together as a single surveillance area in response to a request for a spontaneous or infrequently requested surveillance event.

35. The system of claim 34, wherein the spontaneous or infrequently requested surveillance event is a gathering of a specified number of persons that requires emergency surveillance.

36. The system of claim 34, wherein the spontaneous or infrequently requested surveillance event is a disaster or crime scene.

37. The system of claim 16, wherein the surveillance property is identified before or at the time that the emergency 911 dispatcher receives the emergency 911 call, the time of identification being dependent upon a particular ALI parameter delivery technique for the emergency 911 call.

38. The system of claim 16, wherein the LSU is located within the wireless network.

39. The system of claim 16, wherein the LSU is located within the Emergency Services Network (ESN).

40. The system of claim 16, wherein the surveillance property is one or any combination of a building, a business, a campus, a national monument, a sports arena, an airport, an amusement park, a bridge, a land area, and a body of water.

* * * * *